United States Patent
Nakamura

(10) Patent No.: US 8,215,285 B2
(45) Date of Patent: Jul. 10, 2012

(54) VARIABLE VALVE DEVICE OF INTERNAL COMBUSTION ENGINE AND CONTROLLER THEREFOR

(75) Inventor: Makoto Nakamura, Isehara (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 217 days.

(21) Appl. No.: 12/614,920

(22) Filed: Nov. 9, 2009

(65) Prior Publication Data

US 2010/0139591 A1   Jun. 10, 2010

(30) Foreign Application Priority Data

Dec. 10, 2008  (JP) ................... 2008-313810

(51) Int. Cl.
*F02D 13/00* (2006.01)
*F02D 13/02* (2006.01)
(52) U.S. Cl. ..................... 123/346; 123/90.15
(58) Field of Classification Search ............... 123/90.15, 123/90.16, 90.17, 345, 346, 347, 348
See application file for complete search history.

(56) References Cited

U.S. PATENT DOCUMENTS

| | | | | |
|---|---|---|---|---|
| 5,509,394 | A * | 4/1996 | Hitomi et al. ............... | 123/559.1 |
| 5,924,395 | A * | 7/1999 | Moriya et al. .............. | 123/90.15 |
| 6,705,257 | B2 * | 3/2004 | Shimizu ....................... | 123/90.15 |
| 7,191,589 | B2 * | 3/2007 | Yasui et al. ..................... | 60/284 |
| 2002/0062801 | A1 * | 5/2002 | Shimizu ....................... | 123/90.16 |
| 2002/0117134 | A1 * | 8/2002 | Nakamura et al. ........... | 123/90.27 |
| 2005/0000480 | A1 * | 1/2005 | Yasui et al. .................. | 123/90.16 |
| 2005/0056242 | A1 * | 3/2005 | Murata et al. ................ | 123/90.15 |
| 2006/0272608 | A1 | 12/2006 | Hara et al. | |
| 2007/0144473 | A1 | 6/2007 | Nakamura et al. | |

FOREIGN PATENT DOCUMENTS

| | | |
|---|---|---|
| JP | 11-264307 A | 9/1999 |
| JP | 2000-034913 A | 2/2000 |
| JP | 2003-020966 A | 1/2003 |
| JP | 2003-172112 A | 6/2003 |
| JP | 2003-269123 A | 9/2003 |
| JP | 2005-127239 A | 5/2005 |
| JP | 2005-325782 A | 11/2005 |
| JP | 2006-329022 A | 7/2006 |
| JP | 2006-342677 A | 12/2006 |
| JP | 2007-016793 A | 1/2007 |
| JP | 2007-198367 A | 8/2007 |
| JP | 2008-002292 A | 1/2008 |

* cited by examiner

*Primary Examiner* — Mahmoud Gimie
(74) *Attorney, Agent, or Firm* — Foley & Lardner LLP

(57) ABSTRACT

A controller of a variable valve device is configured to, before starting an internal combustion engine, set an operation angle varying mechanism to control an intake valve of the engine to have such an operation angle as to retard a valve close timing of the intake valve relative to a piston bottom dead center; define a given period from a instruction time when an instruction signal is fed to the controller for starting the engine to a time when a combustion of air/fuel mixture is actually commenced in the engine; and when, in the given period, a temperature representing the temperature of the engine is lower than a predetermined temperature, reduce the operation angle of the intake valve so as to bring the valve close timing of the intake valve near to the piston bottom dead center.

19 Claims, 16 Drawing Sheets

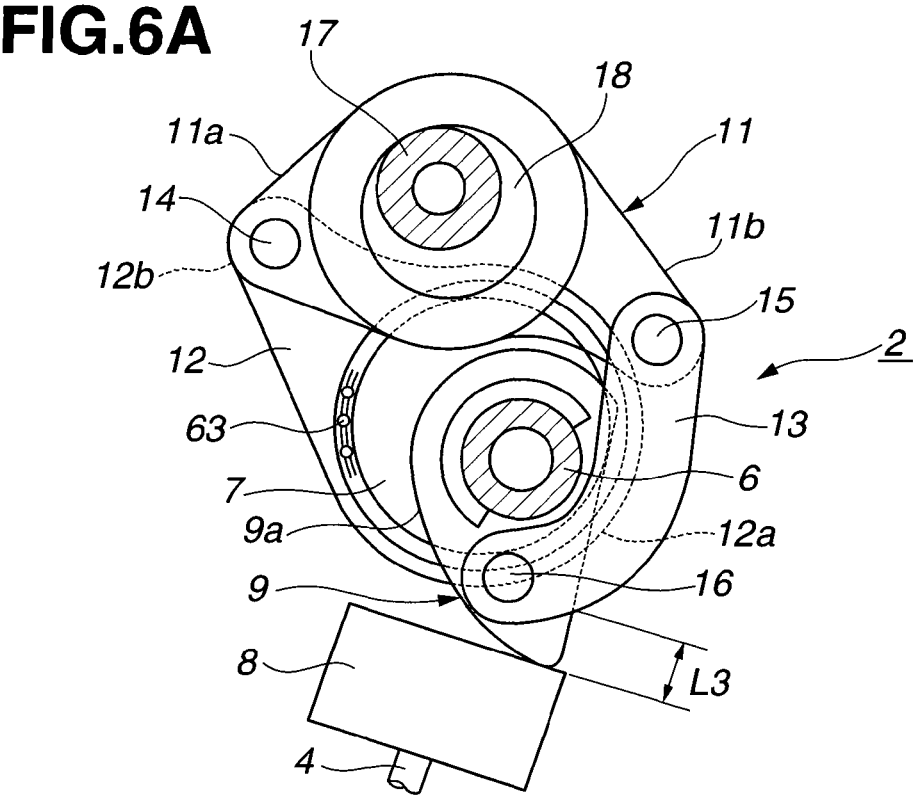
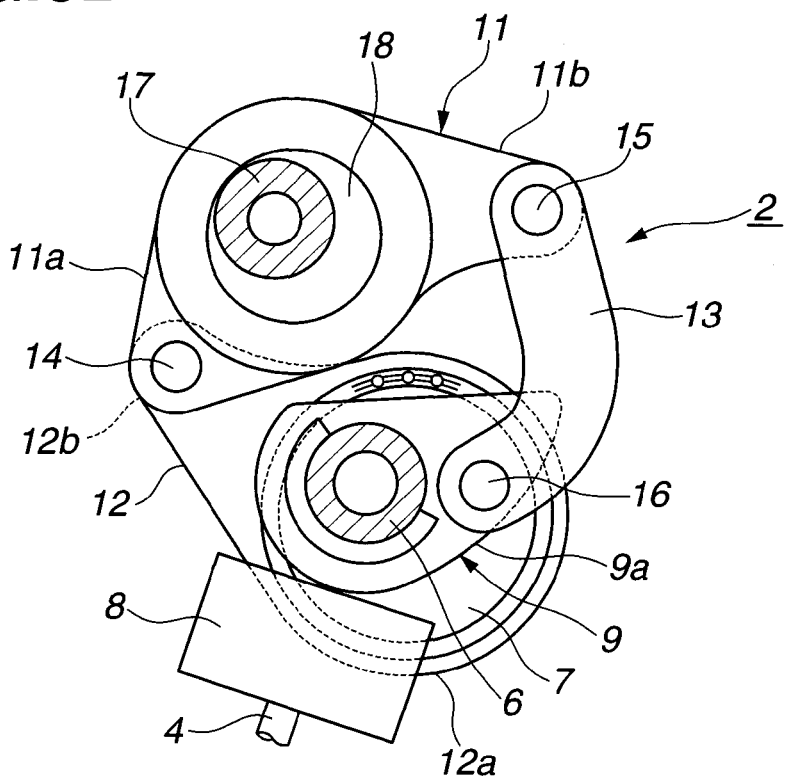

VARIABLE VALVE DEVICE OF INTERNAL COMBUSTION ENGINE AND CONTROLLER THEREFOR

BACKGROUND OF THE INVENTION

1. Field of the Invention

The present invention relates to a variable valve device of an internal combustion engine that continuously varies an operating posture (viz., lift degree and operation angle) of engine valves (viz., intake valves and/or exhaust valves) and to a controller for controlling operation of the variable valve device.

2. Description of the Related Art

Japanese Laid-open Patent Application (Tokkai) 2003-269123 shows one of variable valve devices of the above-mentioned type. That is, the variable valve device of the is publication is constructed to continuously vary the lift degree and operation angle of intake valves of the internal combustion engine. When, in the disclosed variable valve device, the engine comes to a stop, a control shaft is turned to a given angular position by a position regulating mechanism thereby to cause the intake valves to have a middle lift degree that is greater than the minimum lift degree. With such measures, the engine starting (or restarting) is improved.

SUMMARY OF THE INVENTION

Although the above-mentioned known variable valve device assures an improved engine starting as is mentioned hereinabove, a marked engine vibration tends to occur at the engine cranking due to an increased internal pressure of the cylinders at the initial stage of cranking, which makes the passengers uncomfortable.

Accordingly, an object of the present invention is to provide a variable valve device of an internal combustion engine, which is free of the above-mentioned drawback.

In accordance with the present invention, there is provided a variable valve device of an internal combustion engine, in which before starting the engine, the intake valves are set to take a valve close timing retarded relative to a piston bottom dead center (BDC) and when, under engine starting condition from a time when a signal for instructing an engine start is issued to a time when combustion of air/fuel mixture actually starts, a temperature representing the temperature of the engine is lower than a predetermined temperature, the intake valves are somewhat shifted in a direction to take a valve close timing advanced toward the piston bottom dead center (BDC), that is, in a direction to reduce the operation angle.

With such arrangement of the invention, at the initial stage of the engine cranking, an effective compression ratio is reduced and thus the internal pressure of the cylinders is reduced, which suppresses or at least minimizes the undesired engine vibration at the engine cranking.

When, in a latter half stage of the engine cranking, the temperature representing the temperature of the engine is lower than the predetermined temperature, the effective compression ratio is increased to a normal level which improves the combustion quality.

In accordance with a first aspect of the present invention, there is provided a controller of a variable valve device for controlling an operation angle varying mechanism that varies an operation angle of an intake valve of an internal combustion engine, which is configured to before starting the engine, set the operation angle varying mechanism to control the intake valve to have such an operation angle as to retard a valve close timing of the intake valve relative to a piston bottom dead center; define a given period from a instruction time when an instruction signal is fed to the controller for starting the engine to a time when a combustion of air/fuel mixture is actually commenced in the engine; and when, in the given period, a temperature representing the temperature of the engine is lower than a predetermined temperature, reduce the operation angle of the intake valve so as to bring the valve close timing of the intake valve near to the piston bottom dead center.

In accordance with a second aspect of the present invention, there is provided a variable valve device of an internal combustion engine for controlling an operation angle varying mechanism that varies an operation angle of an intake valve of the engine, which is characterized in that before starting the engine, the operation angle varying mechanism is so set as to control the intake valve to have such an operation angle as to have an effective compression ratio smaller than the maximum effective compression ratio; means is provided to define a given condition in which under rotation of a crankshaft of the engine an ignition plug is energized; and when under the given condition the temperature representing the temperature of the engine is lower than the predetermined degree, the operation angle varying mechanism is so controlled as to control the intake valve to have such an operation angle as to bring the valve close timing of the intake valve near to a timing when the maximum effective compression ratio is provided.

In accordance with a third aspect of the present invention, there is provided a variable valve device for varying an operation angle of an intake valve of an internal combustion engine, which comprises an operation angle varying mechanism that varies the operation angle thereby to control a valve close timing of the intake valve; and control means that, when detecting a knocking of the engine, controls the operation angle varying mechanism to control the operation angle in a manner to retard the valve close timing of the intake valve relative to a piston bottom dead center.

BRIEF DESCRIPTION OF THE DRAWINGS

Other objects and advantages of the present invention will become apparent from the following description when taken in conjunction with the accompanying drawings, in which:

FIGS. 6A and 6B are views similar to FIGS. 5A and 5B, but showing a maximum lift control condition of the intake VEL;

DETAILED DESCRIPTION OF EMBODIMENTS

In the following, embodiments of the present invention will be described in detail with reference to the accompanying drawings. The embodiments of the invention are of a type applied to a four-cycle internal combustion engine powered by gasoline.

First, a first embodiment of the present invention will be described.

Figure 1:
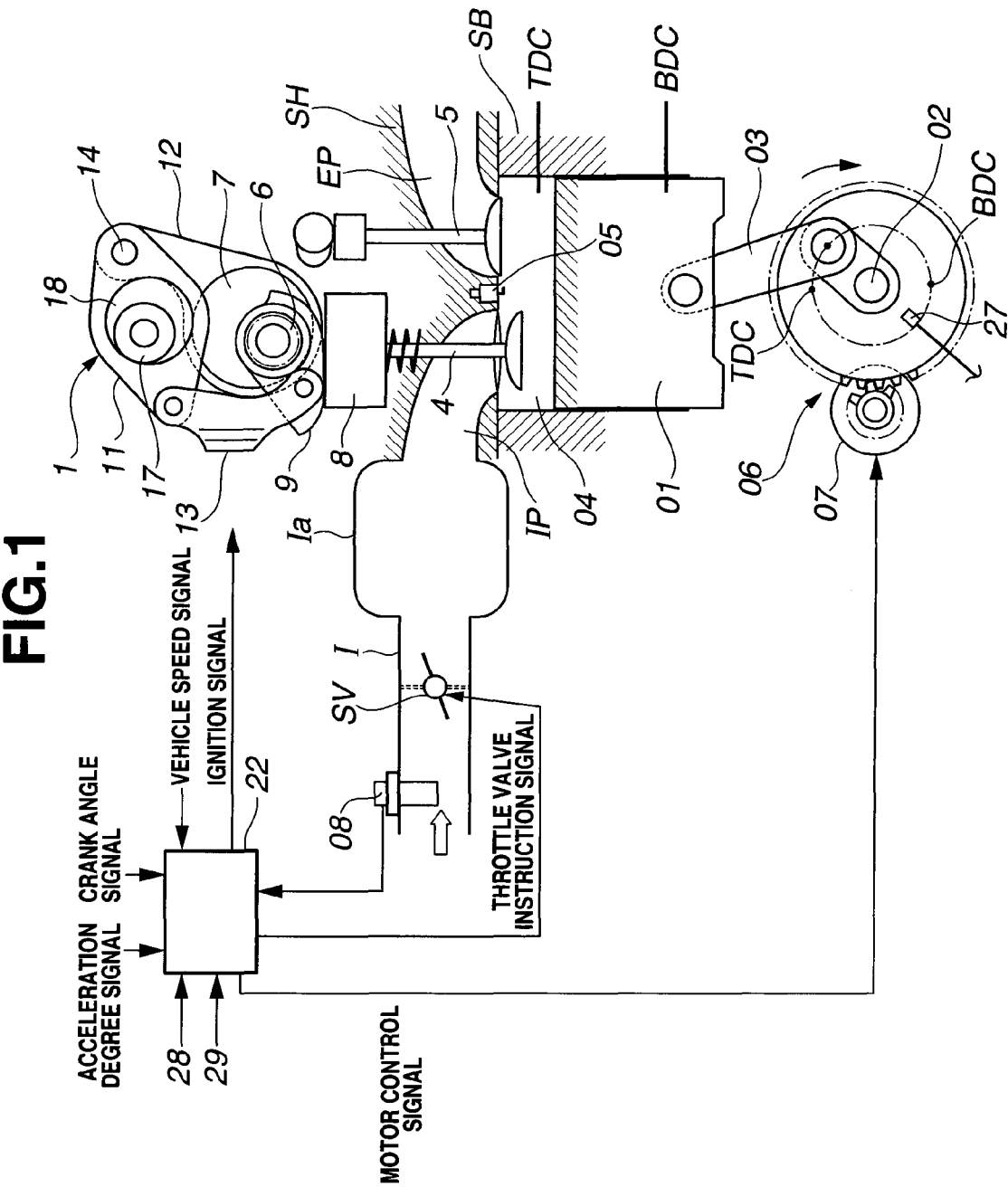
FIG. 1 is a schematic view of a variable valve device of an internal combustion engine, which is a first embodiment of the present invention.

Before the description, entire construction of an internal combustion engine to which the present invention is practically applied will be briefly explained with reference to FIG. 1. As is shown in FIG. 1, a cylinder block SB is formed with a cylinder bore (only one is shown) in which a piston 01 is reciprocatively movably installed. Disposed on cylinder block SB is a cylinder head SH that has two intake ports IP and two exhaust ports EP that are all exposed to the cylinder bore to constitute a combustion chamber 04 with the aid of piston 01. Two intake valves 4 and 4 and two exhaust valves 5 and 5 are operatively incorporated with intake ports IP and exhaust ports EP respectively in a known manner. That is, each valve 4 or 5 functions to open and close an open end of the corresponding port IP or EP.

Piston 01 is connected to a crankshaft 02 through a connecting rod 03. As shown, between a crown surface of piston 01 and a lower surface of cylinder head SH, there is defined the combustion chamber 04.

The two intake ports IP have upstream ends merged with a conduit defined in an intake manifold Ia that has an intake pipe I extending upstream. As shown, intake pipe I is equipped with a butterfly type throttle valve SV that controls the amount of air led to intake ports IP. Although not shown in the drawing, a fuel injection valve is connected to intake ports IP in a manner to inject a controlled amount of fuel toward the open ends of intake ports IP. If desired, such fuel injection valve may be exposed to combustion chamber 04 to directly inject fuel to the combustion chamber 04. An ignition plug 05 is mounted on a center of ceiling of combustion chamber 04, as shown.

Denoted by numeral 07 is a starter motor that drives or starts up crankshaft 02 through a pinion gear mechanism 06 upon need of engine starting.

Due to work of a variable valve device, the operating posture (viz., lift degree and operation angle) of each intake valve 4 is varied. In other words, a lift phase (or valve open/close timing) of each intake valve 4 is varied by the variable valve device.

Figure 2:
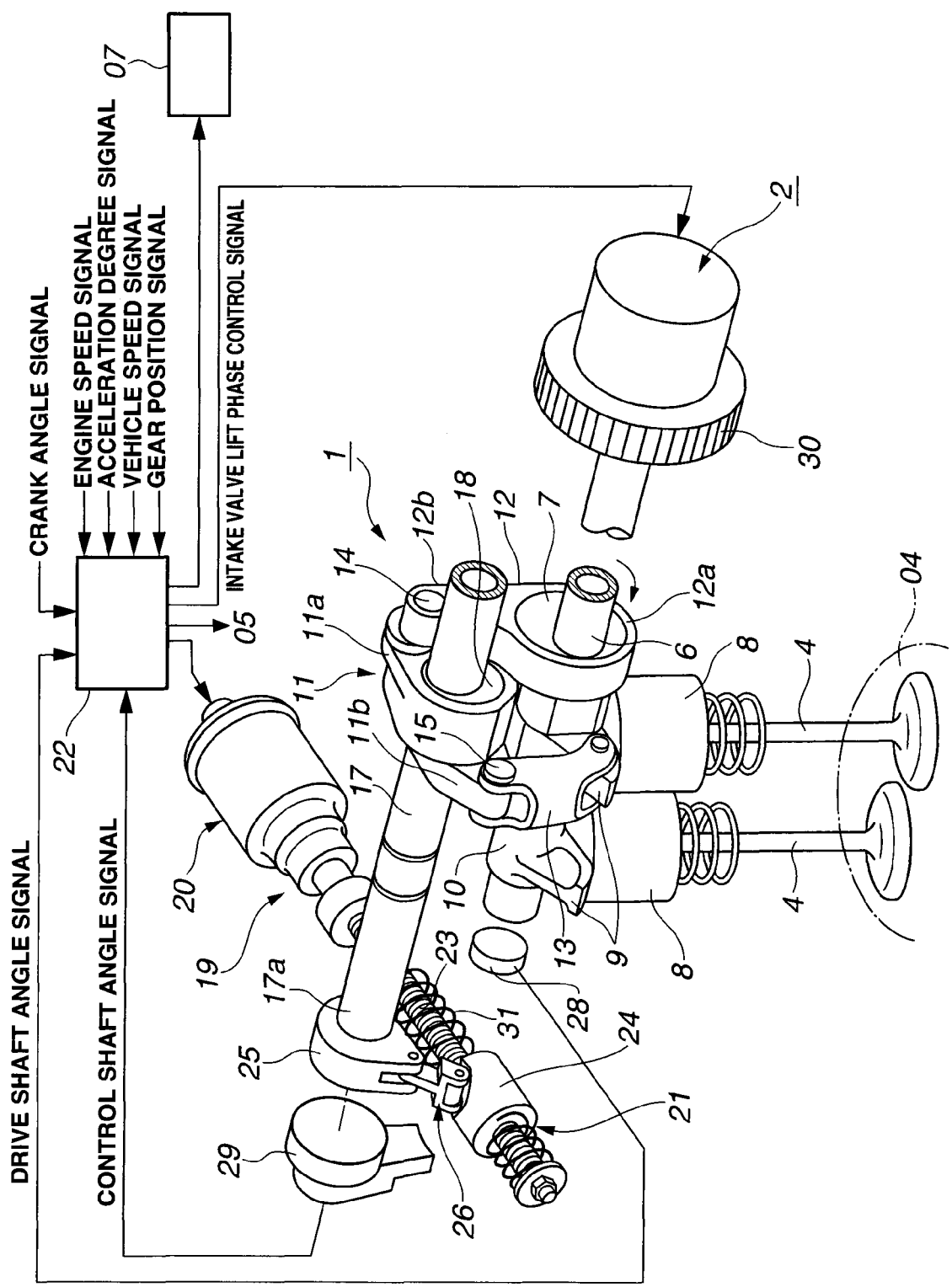
FIG. 2 is a perspective view of an intake VEL (viz., first variable mechanism) and an intake VTC (viz., second variable mechanism), which are employed in the first embodiment and applied to intake valves of the engine.

As is seen from FIGS. 1 and 2, the variable valve device generally comprises a lift operation angle varying mechanism (viz., intake VEL) that functions to controls a valve lift degree and operation angle of the intake valves 4 and 4 and a valve timing varying mechanism (viz., intake VTC) 2 that functions to control a valve open/close timing of the intake valves 4 and 4.

Since the intake VEL is substantially the same as an intake VEL shown in Japanese Laid-open Patent Application (Tokkai)2003-172112 filed by the same applicant, the construction of the intake VEL will be briefly described in the following.

That is, the intake VEL generally comprises a hollow drive shaft 6 that is rotatably mounted on bearing portions provided on cylinder head SH, eccentric drive cams 7 (only one is shown) that are tightly mounted on drive shaft 6, several pairs of swing cams 9 and 9 (only one pair is shown) that are rotatably disposed about drive shaft 6 and contactable with valve lifters 8 and 8, which are arranged on tops of valve stems of intake valves 4 and 4, to make opening movement of intake valves 4 and 4, and a transmitting mechanism that transmits a rotational force of drive cam 7 to swing cams 9 and 9 to swing the same.

Drive shaft 6 has at one end a timing sprocket 30 around which part of a timing chain (not shown) is put to be driven by the above-mentioned crankshaft 02. In FIG. 2, under normal condition, drive shaft 6 turns clockwise, that is, in a direction of the arrow.

Eccentric drive cam 7 is generally ring-shaped and tightly disposed on drive shaft 6. As will be understood from FIG. 2, drive cam 7 has a center radially offset from a shaft center of drive shaft 6 by a given degree.

Figure 5A:
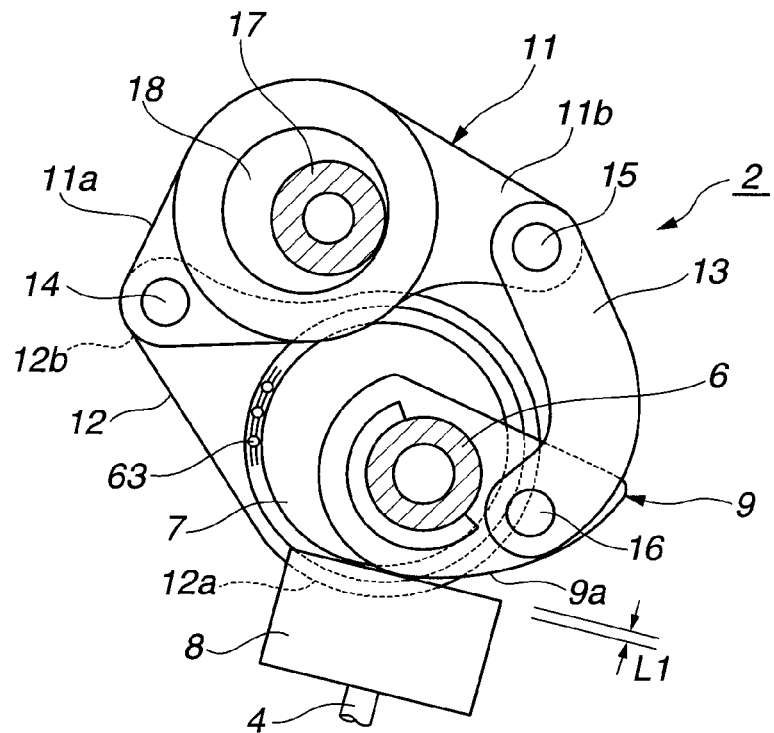
FIGS. 5A and 5B are side views of the intake VEL employed in the first embodiment, showing a minimum lift control condition is of the intake VEL, the views being taken from the direction of the arrow "X" of FIG. 2.

As will be understood from FIGS. 2 and 5A, swing cams 9 and 9 are identical in shape and have each a rain-drop shape. These swing cams 9 and 9 are integrally connected to axially both ends of a cylindrical cam shaft 10 that is rotatably disposed on drive shaft 6.

Each swing cam 9 is formed with a cam surface 9a that comprises a base circular surface that is placed near a shaft side of cam shaft 10, a rounded ramp surface that extends away from the base circular surface toward a cam nose portion and a lift surface that extends from the rounded ramp surface to a maximum lift part of the cam nose portion, which is placed at a leading end of the lift surface. In response to angular position of swing cams 9, the base circular surface, rounded ramp surface or lift surface of each swing cam 9 contacts selectively a given portion of an upper surface of the corresponding valve lifter 8. Of course, when the maximum lift part is brought into contact with the given portion, the corresponding intake valve 4 assumes a full-open position.

The transmitting mechanism comprises a rocker arm 11 that is arranged above drive shaft 6, a link arm 12 that links an end 11a of rocker arm 11 and drive cam 6 together, and a link rod 13 that links the other end 11b of rocker arm 11 and swing cam 9 together.

Rocker arm 11 has a cylindrical bore in which an aftermentioned control cam (18) is rotatably disposed. That is, rocker arm 11 is rotatably held by the control cam (18) through the cylindrical bore. The end 11a of rocker arm 11 has a pin 14 to which an end of link arm 12 is pivotally connected, and the other end 11b of rocker arm 11 is pivotally connected to an end 13a of link rod 13 through a pin 15.

Link arm 12 is formed at a larger circular base portion with a circular opening that is rotatably put around the abovementioned drive cam 7 and at a leading end portion with a small opening that is rotatably put around the pin 14 of rocker arm 11.

Link rod 13 has the other end rotatably connected to the cam nose portion of one of swing cams 9 and 9 through a pin 16.

Above drive shaft 6, there is parallelly arranged a control shaft 17 that is rotatably held by the same bearing portions provided on cylinder head SH by which the drive shaft 6 is also rotatably held. As shown in the drawing, around control shaft 17, there is tightly disposed a control cam 18 that is rotatably disposed in the cylindrical bore of the above-mentioned rocker arm 11.

As shown, control shaft 17 extends in parallel with drive shaft 6, that is, in a fore-and-aft direction of the associated engine, and control shaft 17 is slightly rotated about its axis by a drive mechanism 19. The control cam 18 has a cylindrical shape whose center is offset from a shaft center of control shaft 17 by a given degree.

Figure 3:
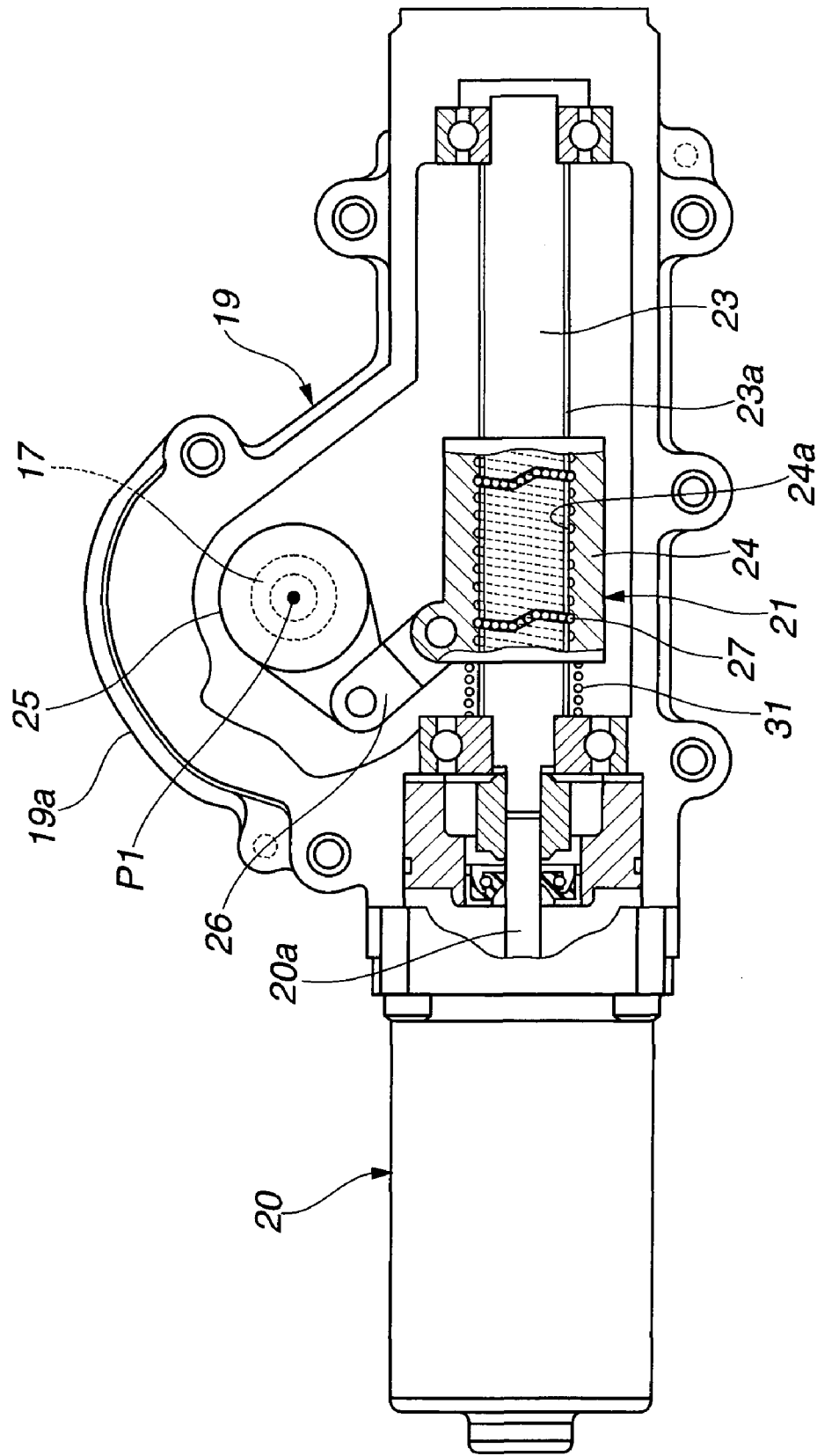
FIG. 3 is a sectional view of a drive mechanism employed in the first embodiment, showing a minimum lift control condition of the drive mechanism.
Figure 4:
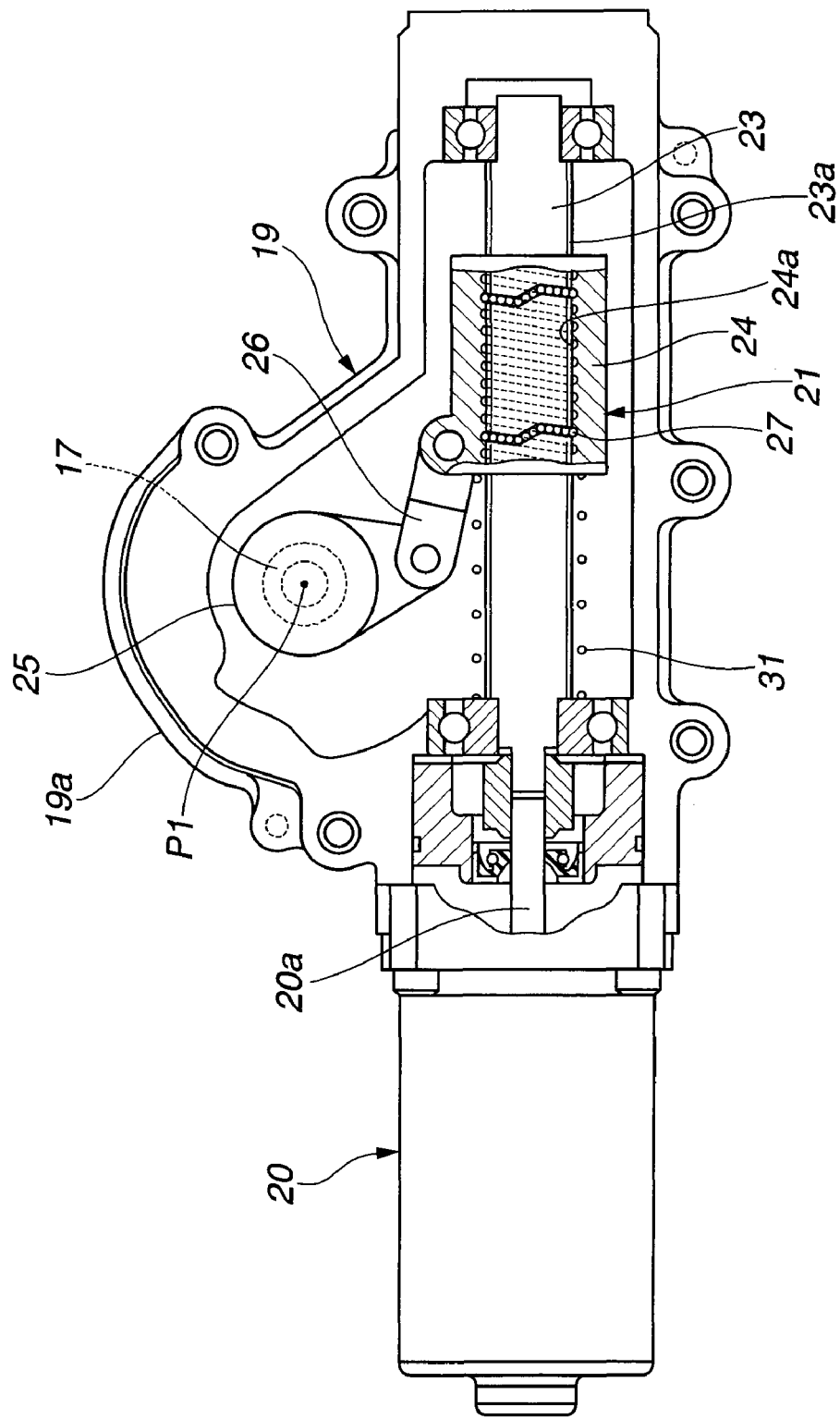
FIG. 4 is a view similar to FIG. 3, but showing a maximum lift control condition of the drive mechanism.

As is seen from FIGS. 2 to 4, drive mechanism 19 generally comprises an electric motor 20 that is fixed to an end portion of a housing 19a and a ball-screw type transmitting device 21 that is mounted in housing 19a to transmit a rotational force of the electric motor 20 to the above-mentioned control shaft 17.

Electric motor 20 is of a proportional DC type, and arranged to be controlled by an instruction signal issued from an after-mentioned controller 22. That is, in accordance with an operation condition of the engine, controller 22 issues a suitable instruction signal to the motor 20.

Upon processing information signals from various sensors, such as, a crank angle sensor detecting an engine speed, an flow meter detecting the amount of air fed to the engine, a temperature sensor 61 detecting the temperature of the engine cooling water, an air temperature sensor detecting the temperature of air fed to the engine, a knocking sensor 62 detecting an engine knocking, a vehicle speed sensor detecting the vehicle speed and an acceleration degree sensor detecting a depress degree of an accelerator pedal, the above-mentioned controller 22 senses an operation condition of the engine and issues instruction signals to throttle valve SV, fuel injection valves, electric motor 20, etc.

As is seen from FIGS. 2 and 3, the above-mentioned ball-screw type transmitting device 21 generally comprises a threaded shaft 23 that is coaxially arranged with a drive shaft of electric motor 20 and driven by the same, a ball nut 24 that is axially movably disposed about threaded shaft 23 and has a thread in a cylindrical inner surface thereof, balls 27 that are operatively put between the thread of ball nut 24 and that of the threaded shaft 23, a connecting arm 25 (see FIG. 2) that is connected to one end of the above-mentioned control shaft 17 and a link member 26 that links connecting arm 25 and ball nut 24.

As is seen from FIG. 3, threaded shaft 23 is formed on an to outer surface thereof with a helical groove 23a of a given width, and threaded shaft 23 has one end connected to a drive shaft 20a of electric motor 20. As shown, two ball bearings (no numerals) are arranged to rotatably support axially opposed ends of threaded shaft 23. Thus, upon energization of electric motor 20, threaded shaft 23 is rotated about its axis.

Due to presence of a gap provided, threaded shaft 23 is permitted to make a slight axial movement.

Ball nut 24 is shaped cylindrical and formed on its cylindrical inner wall with a helical groove 24a for receiving balls 27 together with helical grooves 23a of threaded shaft 23. More specifically, the two helical grooves 24a and 23a face each other to define therebetween a so-called helical tube in which the balls 27 are rotatably received. Due to provision of such balls 27, the rotational movement of threaded shaft 23 about its axis induces a smoothed axial movement of ball nut 24 on and along threaded shaft 23.

As shown in FIG. 3, a coil spring 31 is compressed between ball nut 24 and the left ball bearing to bias ball nut 24 rightward in the drawing. With such coil spring 31, undesired backrush phenomenon of ball nut 24 is suppressed. Furthermore, as will be understood from FIG. 1, due to the biasing force of coil spring 31, intake valves 4 and 4 are constantly biased toward their maximum lift position (viz., maximum operation angle).

Accordingly, once the engine stops, intake valves 4 and 4 are assuredly biased toward the maximum retarded angle side (viz., maximum operation angle) by the biasing force of coil spring 31.

In the following, operation of the intake VEL 1 will be briefly described with the aid of the accompanying drawings.

When the associated engine stops, controller 22 stops energization of electric motor 20, and thus, as is seen from FIG. 4, ball nut 24 is moved rightward to the rightmost position due to to the biasing force of coil spring 31. During this, as is seen from FIG. 1, control shaft 17 is turned in one direction (viz., clockwise direction in the drawing) about its axis through link member 26 and connecting arm 25.

Although not shown in the drawings, stoppers are provided is for restricting the clockwise-most and counterclockwise-most positions of control shaft 17.

Accordingly, when, as is seen from FIGS. 6A and 6B, control shaft 17 is turned about its axis, control cam 18 tightly disposed on control shaft 17 is revolved around the axis of control shaft 17 to a position where, as is seen from these two drawings, a thicker portion of control cam 18 takes a lower position near drive shaft 6. With such revolution of control shaft 18, the pivot point between the end 11b of rocker arm 11 and link rod 13 is moved downward with respect to drive shaft 6, so that swing cams 9 and 9 are turned entirely clockwise having their cam nose portions pulled downward.

Figure 7:
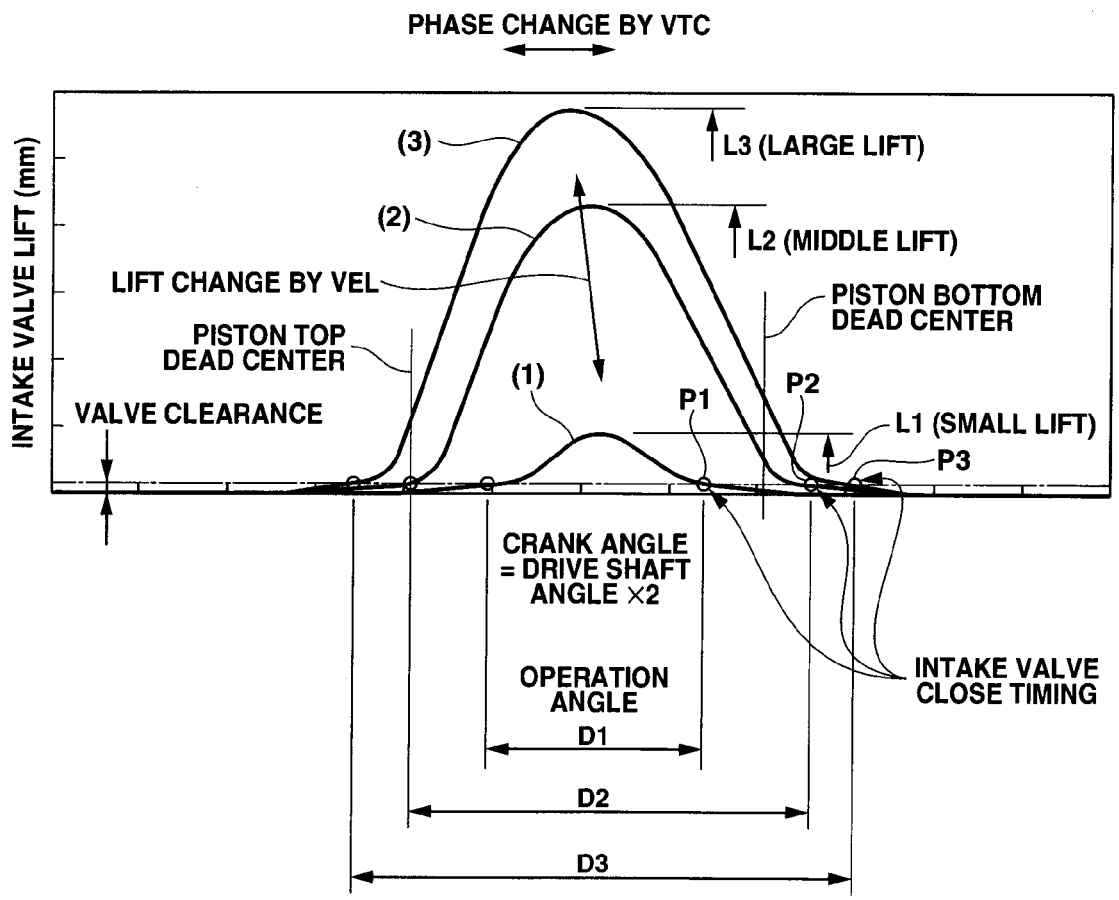
FIG. 7 is a graph showing characteristic curves representing a valve lift and a valve open/close timing of the intake valves, which are carried out by the intake VEL and intake VTC.

Accordingly, when, due to rotation of drive cam 7, the end portion 11a of rocker arm 11 is pushed up through link arm 12, the moved distance (or lift degree) of the end portion 11a is transmitted through link rod 13 to swing cams 9 and 9 and thus to valve lifters 8 and 8 (see FIG. 2), so that, as is shown in a valve lift characteristic graph of FIG. 7, intake valves 4 and 4 are forced to take a larger lift L3 with a larger operation angle D3. Accordingly, under this condition, the valve close timing P1 of each intake valve 4 is controlled to a retarded side.

It is be noted that the operation angle refers to a crank rotation angle corresponding to an open period of intake valves 4 and 4. As is known, the crank rotation angle is twice the angle of drive shaft 6.

When an ignition switch is turned ON, starting motor 07 is energized to start cranking of the engine. At an initial stage of this cranking, intake valves 4 and 4 keep their maximum lift to positions (or maximum operation angle "D3") due to the biasing force of coil spring 31, so that the closing timing (IVC) of intake valves 4 and 4 takes a retarded side as compared with the piston bottom dead center.

When thereafter the cranking speed increases to a predetermined speed, controller 22 forces electric motor 20 to turn in an opposite direction. Upon this, the turning torque of electric motor 20 is transmitted to threaded shaft 23 to turn the same. Thus, in response to turning of threaded shaft 23, ball nut 24 is moved on and along threaded shaft 23 in a direction to approach electric motor 20 from a previous position (not shown) to a middle position, that is, a position between the respective positions of FIGS. 3 and 4. With this movement of ball nut 24, control shaft 17 is rotated by a given angle in a clockwise direction from the position of FIG. 6A (or FIG. 6B).

Figure 5B:
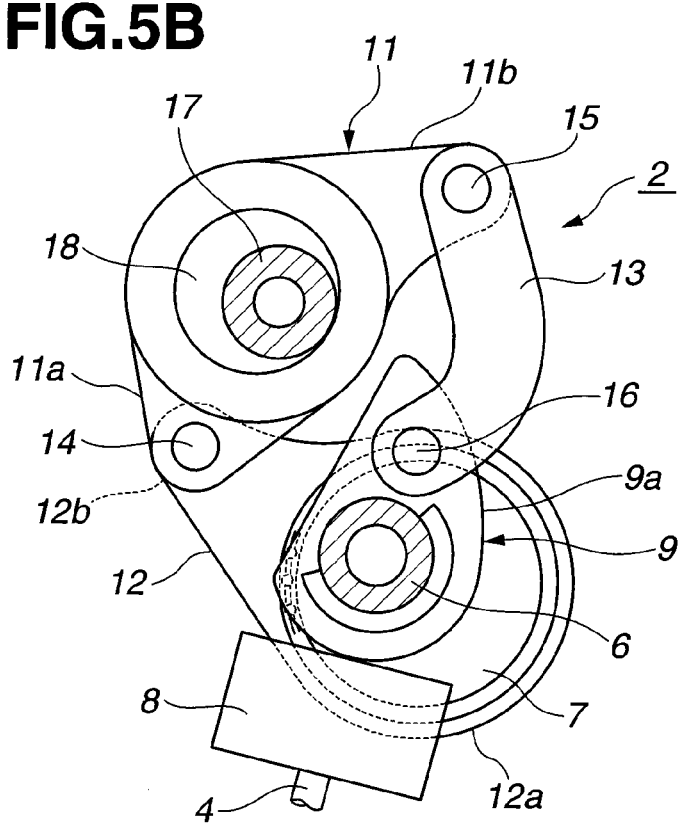

Accordingly, control cam 18 secured to control shaft 17 is revolved to an angular middle position between the respective positions shown by FIGS. 5 and 6 shifting the thicker portion of control cam 18 downward. Thus, when drive cam 7 is rotated pushing up the end portion 11a of rocker arm 11 through link arm 12, a corresponding lift is transmitted to swing cams 9 and 9 and valve lifters 8 and 8. With this, intake valves 4 and 4 are forced to take a middle lift L2 with a middle operation angle D2 as shown in the graph of FIG. 7. That is, the lift degree changes from L3 to L2 and the operation angles changes from D3 to D2. Accordingly, the valve close timing of intake valves 4 and 4 is advanced approaching the piston bottom dead center.

When, after completion of the engine starting, the engine is brought to a normal operation condition, intake valves 4 and 4 are controlled by controller 22 to have a suitable lift between a smaller lift L1 (or smaller operation angle D1) and the middle lift L2 (or middle operation angle D2) in accordance with the operating condition of the vehicle. Furthermore, due to work of an after-mentioned intake VTC2, a lift phase is controlled to be advanced. With this control, the valve close timing of intake valves 4 and 4 is advanced, so that a valve overlap between intake and exhaust valves 4 and 5 is increased to reduce an undesired pumping loss and thus improve a fuel consumption of the engine.

When, due to depression of an accelerator pedal, the operation condition of the engine is shifted from the normal operation condition to a high load operation condition, controller 22 instructs electric motor 20 to rotate in one direction, so that control cam 18 on control shaft 17 is revolved in a counter-clockwise direction causing the axis thereof to move downward in FIGS. 6A and 6B. With this movement of control cam 18, rocker arm 11 is entirely shifted toward drive shaft 6 causing the end portion 11b thereof to press down the cam nose portion of the swing cam 9 through link rod 13 thereby turning the swing cam 9 (actually, two swing cams 9 and 9 as is seen from FIG. 2) clockwise by a given degree.

Accordingly, when drive cam 7 is turned by a degree to push up the end portion 11a of rocker arm 11 through link arm 12, a corresponding lift is transmitted to swing cams 9 and 9 and valve lifters 8 and 8 through link rod 13. During this, as is seen from the graph of FIG. 7, the valve lift continuously increases to the curve of L3.

That is, the lift degree of intake valves 4 and 4 is continuously varied in a range between the curve of L1 and the curve of L3 in accordance with the operating condition of the engine. In other words, the operation angle of intake valves 4 and 4 is continuously varied in a range between the angle D1 and the angle D3 in accordance with the engine operating condition.

Since the above-mentioned VTC2 is of a vane type and substantially the same as that described in Japanese Laid-open Patent Application (Tokkai) 2007-198367 filed by the same applicant, the construction of the VTC2 will be briefly described in the following with reference to FIGS. 8 and 9.

The VTC2 generally comprises a timing sprocket 30 that transmits a rotational force to drive shaft 6, a vane member 32 that is fixed to an end of drive shaft 6 and rotatably received in timing sprocket 30, and a hydraulic circuit 33 that rotates vane member 32 in fore-and-aft directions with the aid of hydraulic power.

Timing sprocket 30 generally comprises a circular housing 34 that rotatably receives vane member 32, a circular front cover 35 that covers a front open portion of housing 34, a circular rear cover 36 that covers a rear open portion of housing 34. These circular housing 34, circular front cover 35 and circular rear cover 36 are united together by four connecting bolts 37 to constitute a cylindrical unit coaxially put on the end of drive shaft 6 as is seen from FIG. 9.

Figure 8:
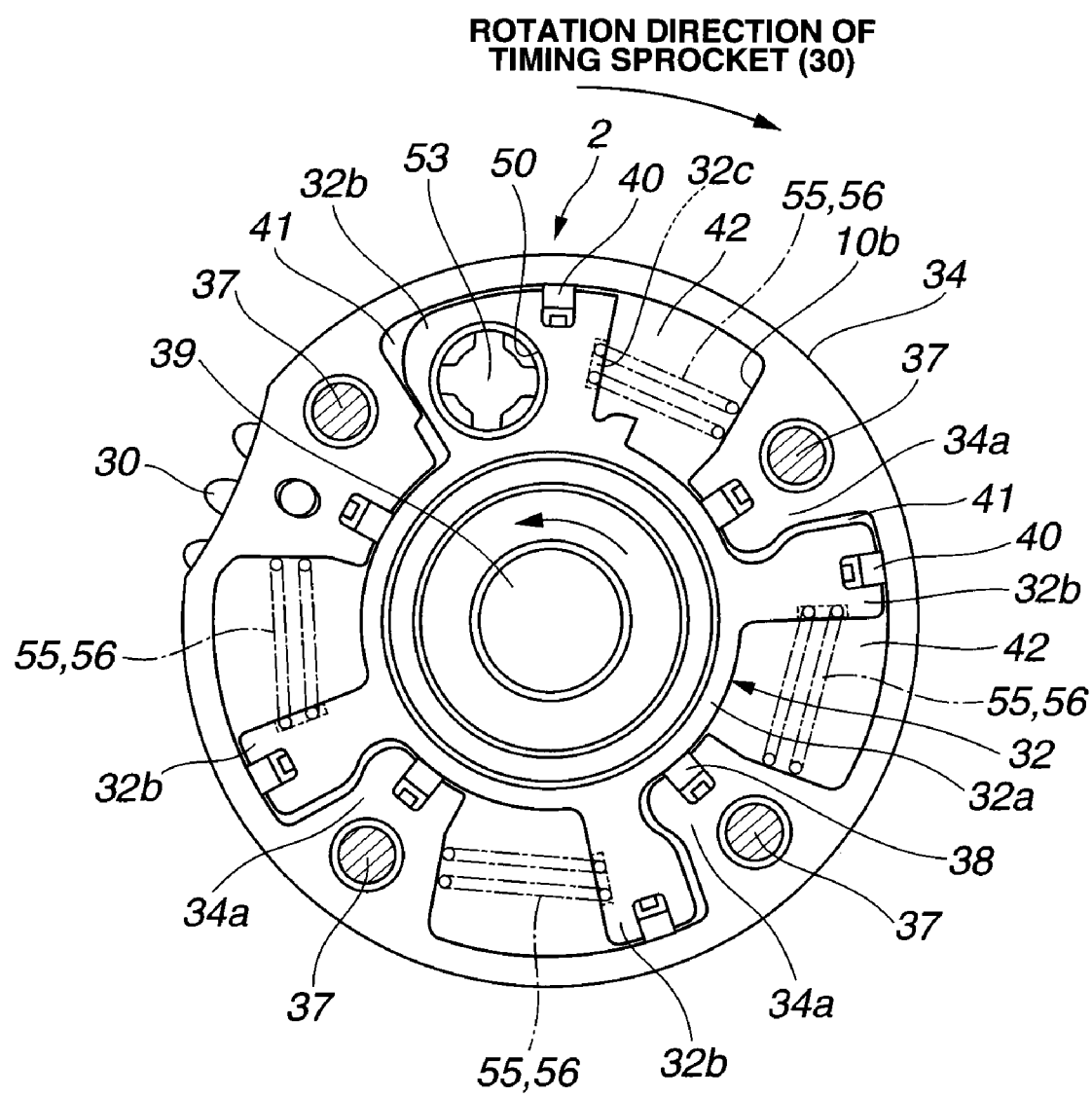
FIG. 8 is a front view of the intake VTC with a front cover removed, showing a maximum retarded control condition of the same.

As is seen from FIG. 8, circular housing 34 has an annular construction and has four shoes 34a that project radially inward from a peripheral portion thereof. These shoes 34a are spaced from one another by about 90 degrees.

As shown, each shoe 34a is trapezoidal in shape and has an opening for receiving the above-mentioned connecting bolt 37. Furthermore, each shoe 34a has at an inward end a rectangular recess in which a seal member 38 biased by a plate spring (not shown) is operatively received, so that the seal member 38 is forced to slidably contact a cylindrical bottom surface of the vane member 32.

Figure 9:
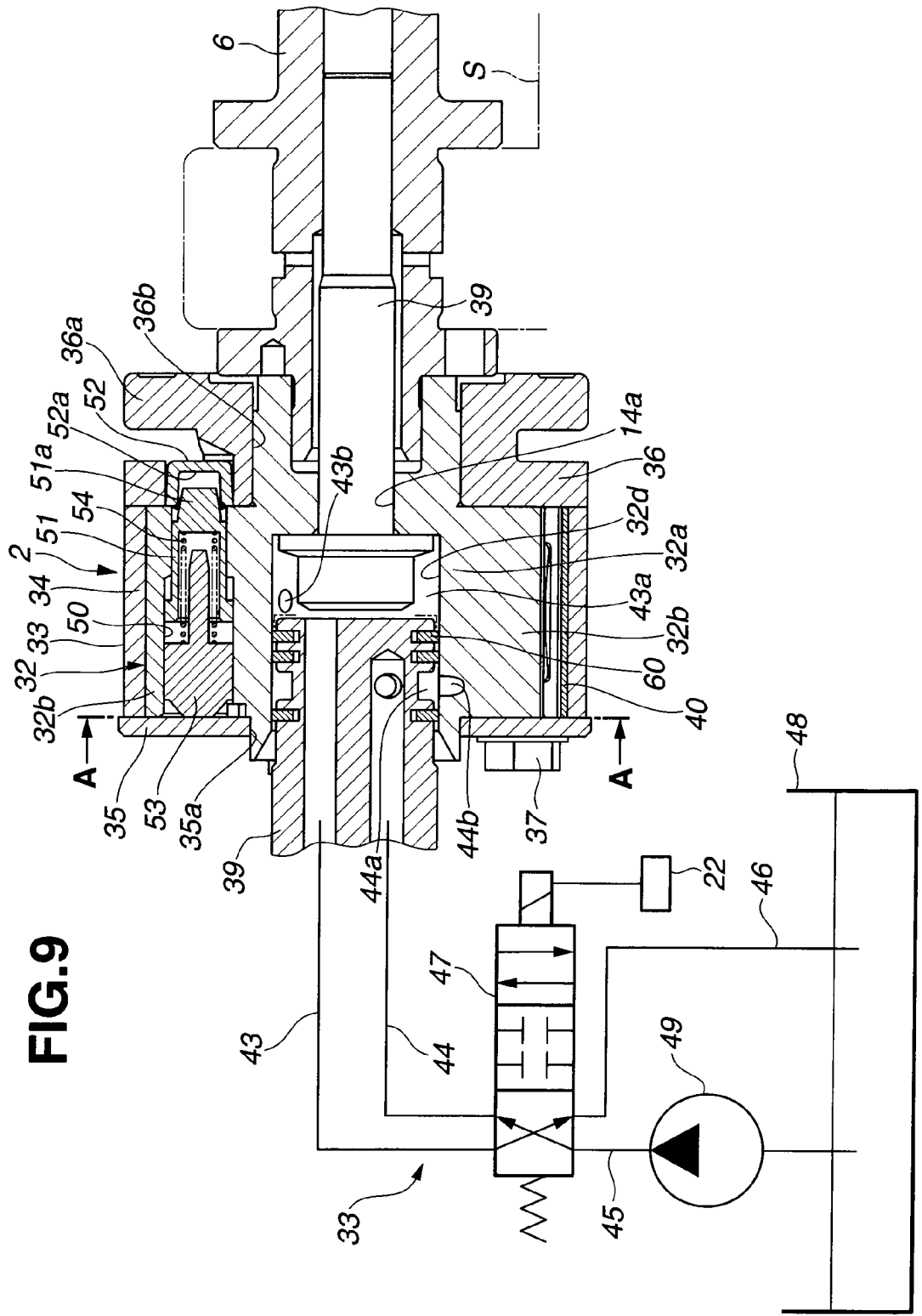
FIG. 9 is a vertically sectioned view of the intake VTC.

As is seen from FIG. 9, circular front cover 35 has at a center portion thereof a larger circular opening 35a and at a peripheral portion four openings (not shown) through which the four connecting bolts 37 pass.

As is understood from FIG. 9, circular rear cover 36 is integrally formed at a rear end thereof with a gear portion 36a that is meshed with the above-mentioned timing chain, and the circular rear cover 36 has at a center portion thereof a larger circular opening 36b.

Vane member 32 comprises an annular vane rotor 32a that has a bolt receiving opening at a center thereof and four vanes 32b that are integrally formed on a peripheral portion of annular vane rotor 32a. These four vanes 32b are spaced from one another by about 90 degrees.

Annular vane rotor 32a has a smaller diameter front portion rotatably received in the circular opening 35a of circular front cover 35 and has a smaller diameter rear portion rotatably received in the circular opening 36b of circular rear cover 36.

As is seen from FIG. 9, vane member 32 is coaxially connected to the front end of drive shaft 6 by means of a connecting bolt 39 that passes through an opening of vane rotor 32a.

As is seen from FIG. 3, three of the four vanes 32b are shaped relatively slim and the remaining one 32b is relatively fat with a trapezoidal shape. The three vanes 32b have substantially the same width and the remaining one 32b has a larger width, so that vane member 23 has a balanced shape in weight.

As is seen from FIG. 8, each vane 32b is placed in a port defined between mutually adjacent shoes 34a of housing 34, and each vane 32b has at an outward end a rectangular recess in which a seal member 40 biased by a plate spring (not shown) is operatively received, so that the seal member 40 is forced to slidably contact an inner cylindrical surface of housing 34.

Furthermore, each vane 32b is formed at one side edge, which faces the direction in which timing sprocket 30 rotates, with two circular recesses 32c for receiving therein respective ends of next-mentioned coil springs 55 and 56.

That is, between the two recesses 32c of each vane 32b and one side edge of shoe 34a of housing 34 that faces the recesses 32c, there are compressed two coil springs 55 and 56 to bias vane member 32 in a retarding direction.

As is seen from the drawing, these two coil springs 55 and 56 are separate and arranged in parallel with each other. When no load is applied to coil springs 55 and 56, they have the same length that is longer than the maximum distance between the mutually facing side edges of vane 32b and shoe 34a. This means that upon assembly the two coil springs 55 and 56 constantly bias vane member 32 in the retarding direction.

These two coil springs 55 and 56 are so arranged not to contact each other even when fully compressed between the mutually facing side edges of vane 32b and shoe 34a. Although not shown in the drawing, a plate like retainer is fitted to circular recesses 32c of each shoe 34a to connect the ends of two coil springs 55 and 56.

As is seen from the drawing, with the aid of the port of housing 34, each vane 32b of vane member 32 has at a left side an advancing chamber 41 and at a right side a retarding chamber 42. Thus, in total, four advancing chambers 41 and four retarding chambers 42 are defined.

As is seen from FIG. 9, the above-mentioned hydraulic circuit 33 comprises a first hydraulic passage 43 that provides the advancing chambers 41 with increase/decrease in a hydraulic pressure and a second hydraulic passage 44 that provides the retarding chambers 42 with increase/decrease in a hydraulic pressure. To these passages 43 and 44, there are connected both a feeding passage 45 and a draining passage 46 through an electromagnetic switch valve 47. In feeding passage 45, there is arranged an oil pump 49 that, upon energization thereof, feeds either one of passages 43 and 44 with an oil contained in an oil pan 48. Draining passage 46 functions to drain the oil from either one of passages 43 and 44 into oil pan 48.

As will be understood from FIG. 9, parts of first and second to hydraulic passages 43 and 44 are formed in a cylindrical member 39 whose one end is received in a bore 32d formed in the above-mentioned annular vane rotor 32a. First and second hydraulic passages 43 and 44 have respective ends connected to ports of switch valve 47 as shown.

Three annular seal members 60 are disposed about the end of cylindrical member 39 to achieve a hermetical sealing between cylindrical member 39 and annular vane rotor 32a. Due to provision of such seal members 60, separation between first and second hydraulic passages 43 and 44 is assuredly made.

First hydraulic passage 43 is communicated with a hydraulic chamber 43a defined in bore 32d. Hydraulic chamber 43a is formed with four branched passages 43b that lead to the four advancing chambers 41 (see FIG. 8) respectively.

While, second hydraulic passage 44 is communicated with an annular passage 44a defined around cylindrical member 39. Annular passage 44a is communicated with the four retarding chambers 42 through four L-shaped passages 44b formed in vane rotor 32a.

The above-mentioned electromagnetic switch valve 47 is of a four-port and three-position type including a valve element that is movable to three positions to change the fluid communication between each of first and second hydraulic passages 43 and 44 and each of feeding and draining passages 45 and 46. The position taken by switch valve 46 is controlled by controller 22.

As is mentioned hereinabove, controller 22 senses the operation condition of the engine and detects a relative angular position between timing sprocket 30 and drive shaft 6 by processing information signals from the crank angle sensor and an after-mentioned drive shaft angle sensor 28 (see FIG. 2).

Due to the switching operation of electromagnetic switch valve 47, just before the actual engine cranking, retarding chambers 42 are fed with a hydraulic pressure and thereafter, advancing chambers 41 are fed with such hydraulic pressure.

Between vane member 32 and circular housing 34, there is provided a lock mechanism that can lock and unlock vane member 32 relative to circular housing 34.

As is seen from FIGS. 8 and 9, the lock mechanism is arranged between the larger vane 32b of vane member 32 and rear cover 36 and comprises a bore 50 (see FIG. 8) that is formed in the larger vane 32b to extend in the same direction as drive shaft 6 and a cylindrical lock pin 51 that is slidably received in bore 50 with a tapered end portion 51a projectable from bore 50 and an engaging bore 52a that is provided by a stopper cap 52 fixed in an opening formed in rear cover 30. Engaging bore 52a is sized and arranged to receive therein tapered end portion 51a of lock pin 51 under a given condition. In a bottom of bore 50, there is tightly put a spring retainer 53 that holds one end of a coil spring 54 for biasing lock pin 51 in a direction away from spring retainer 63, that is, rightward in FIG. 9.

Into engaging bore 52a, there is fed through an opening (not shown) the oil from retarding chambers 42 or oil pump 49.

When vane member 32 comes to the most retarded position, lock pin 51, more specifically, the tapered end portion 51a of the lock pin 51, is put into engaging bore 52a by the biasing force of coil spring 54 thereby to lock vane member 32 relative to circular housing 34 at the most retarded position. When engaging bore 52a is applied with a pressurized oil from retarding chambers 42 or oil pump 49, lock pin 51 is moved back against the biasing force of coil spring 54 thereby to release the locked condition of vane member 32 relative to circular housing 34.

FIG. 7 is a graph showing characteristic curves representing a valve lift and a valve open/close timing of intake valves 4 and 4. More specifically, the graph shows a condition in which due to the work of intake VTC2, the valve open/close timing of intake valves 4 and 4 is controlled to the most retarded side. In the illustrated example, with increase of the lift degree, the phase of the peak lift is slightly inclined toward the advanced side. However, it has been revealed that such degree of inclination exerts substantially no influence on the operation of the engine.

The operation of the intake VTC2 is clearly described in the above-mentioned Japanese Laid-open Patent Application (Tokkai)2007-198367. Thus, the operation of the intake VTC2 will be briefly described in the following explanation directed to a controlled operation effected by controller 22 at the time of engine starting.

The controlled operation at the time of engine starting will be described with the aid of the flowchart shown in FIG. 10.

At step S1, that is, just before effecting the engine cranking, due to the work of intake VEL1, intake valves 4 and 4 are set to and kept at a maximum operation angle D3, and due to the work of intake VTC2, intake valves 4 and 4 are set to and kept at the most retarded side. As has been mentioned hereinbefore, for keeping intake valves 4 and 4 to the large operation angle D3, the biasing force produced by coil spring 31 (see FIG. 4) is operatively used.

Under this condition, intake valves 4 and 4 are controlled to take the characteristic curve denoted by Reference (3) in the graph of FIG. 7. That is, intake valves 4 and 4 are controlled to take the maximum lift and the most retarded condition.

More specifically, under such condition, the valve close timing (viz., IVC) of intake valves 4 and 4 is sufficiently retarded (at point P3 in the graph of FIG. 7) relative to the piston bottom dead center and thus an effective compression ratio is set to a smaller value.

Figure 10:
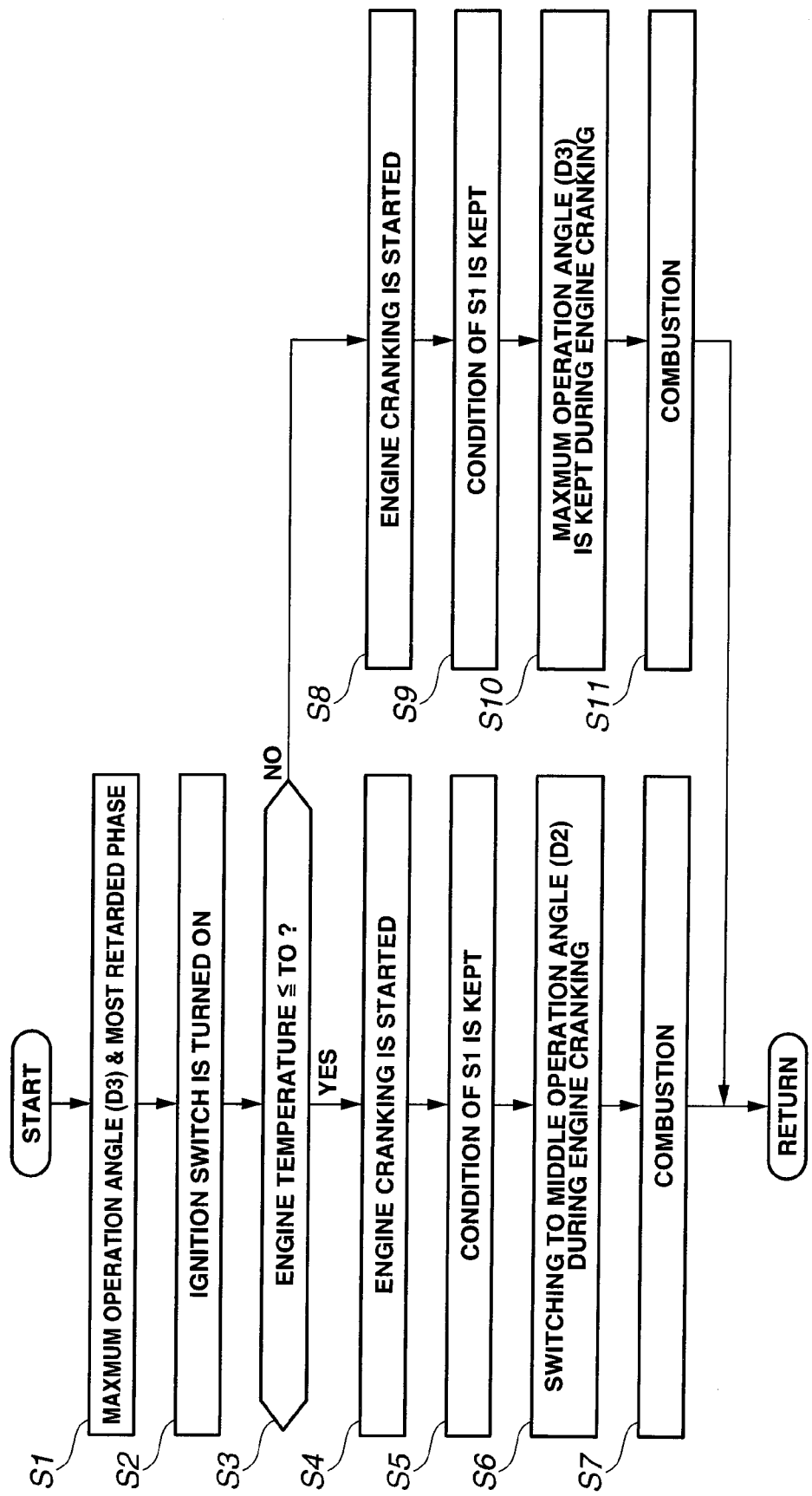
FIG. 10 is a flowchart showing programmed operation steps carried out by a controller employed in the first embodiment.

Referring back to the flowchart of FIG. 10, at step S2, an ignition switch is turned ON. Upon this, programmed operation flow goes to step S3.

At step S3, judgment is carried out as to whether a temperature of the engine (for example, the temperature in the intake manifold or the temperature of engine cooling water) is lower than a predetermined temperature "To" or not. When the temperature is lower than the predetermined temperature "To", the operation flow goes to step S4 judging that the engine is under a cold condition and controlling the throttle valve SV at a larger open degree.

At step S4, engine cranking is started and the operation flow goes to step S5.

At step S5, the control for keeping intake valves 4 and 4 at the maximum operation angle D3 and at the most retarded side is carried out. As is mentioned hereinabove, under such control, intake valves 4 and 4 are controlled to take the maximum lift and the most retarded condition, and thus the effective compression ratio of the engine takes a smaller value. Accordingly, undesired vibration of the engine at an initial stage of engine cranking can be reduced effectively.

The cold engine starting will be described with the aid of the time charts of FIGS. 11A and 11B. Once the engine cranking is started at the time (1) of FIG. 11A, a large compression force would be applied to the piston as is indicated by a broken line in FIG. 11B causing generation of the large engine vibration. Of course, such vibration makes the passengers uncomfortable. Furthermore, in case that the vehicle is of a hybrid type powered by both an internal combustion engine and an electric motor in which engine starting is automatically made regardless of driver's will, such engine vibration makes the passengers much uncomfortable.

Figure 11A:
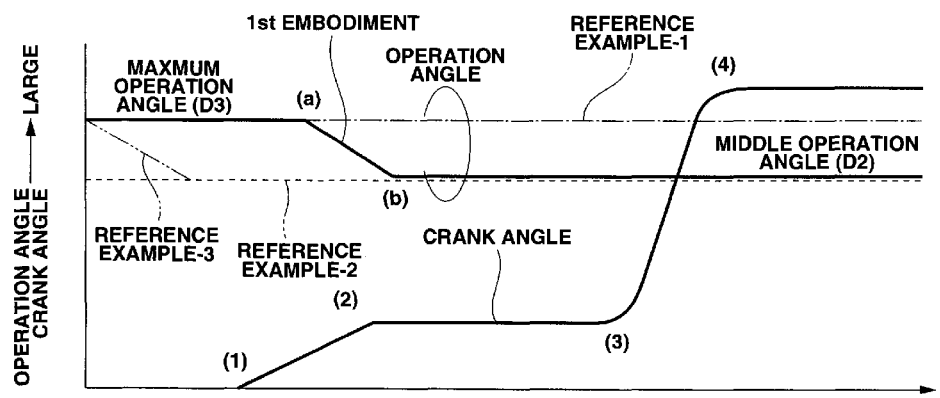
FIGS. 11A and 11B are time charts provided when a cold starting is carried out by the engine, FIG. 11A showing a relation between an operating degree of the intake valve controlled by the controller and an elapsed time, and FIG. 11B showing a relation between an engine vibration and an elapsed time.
Figure 11B:
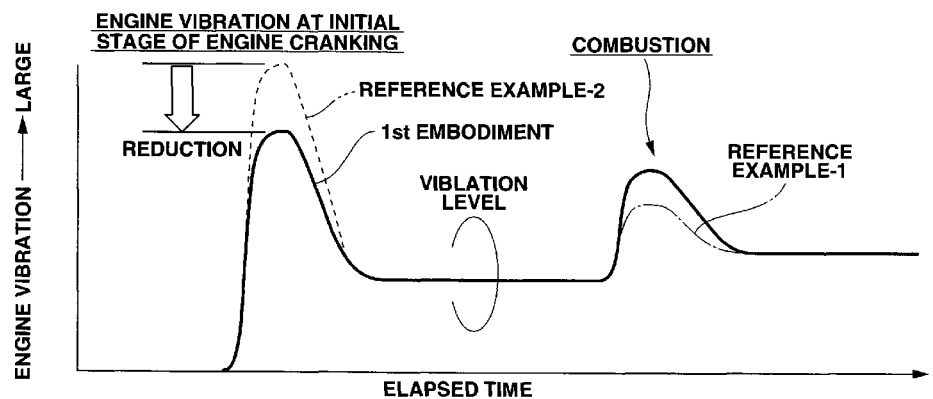

Accordingly, in the present invention, as is indicated by the solid line in the graph of FIG. 11B, such engine vibration that would occur at the initial stage of engine cranking can be sufficiently reduced because the valve close timing (IVC) of intake valves 4 and 4 is sufficiently retarded with respect to the piston bottom dead center.

For clarifying the advantages expected by the present invention, some Reference examples will be briefly described in the following with reference to FIGS. 11A and 11B.

Indicated by a broken line in FIGS. 11A and 11B is a case of Reference example-2 in which for improving the engine starting, the engine cranking is started with an operation angle of intake valves set to "D2" (see FIG. 7). In this example-2, the effective compression ratio is high and thus the engine vibration at the initial stage of engine cranking becomes high as is indicated by the broken line in FIG. 11B, which tends to make the passengers uncomfortable.

If the operation angle of intake valves is set to a small value "D1" (see FIG. 7) to advance the valve open/close timing of intake valves relative to the piston bottom dead center, the effective compression ratio can be sufficiently reduced. However, in this case, the following drawbacks tend to occur. That is, when the engine cranking is started with the open/close timing of the intake valves assuming the piston bottom dead center, a marked volume of air led into the cylinders under standstill of the engine causes the first engine cranking to produce a marked compression force. Of course, in this case, undesired engine vibration takes place at the initial stage of engine cranking.

In view of the above, for effectively reducing the engine vibration at the initial stage of engine cranking, it is preferable to increase the operation angle of intake valves 4 and 4 for retarding the valve close timing (IVC) of the valves relative to the piston bottom dead center.

Referring back to the flowchart of FIG. 10, at step S6, after passing a predetermined time (a, see FIG. 11A) from the time at to which the engine cranking has started, the operation angle of intake valves 4 and 4 is gradually reduced toward a middle operation angle "D2" by the work of intake VEL1. Since, under this case, the engine cranking has started, switching responsiveness for the operation angle of intake valves 4 and 4 is increased. This is because the friction factor of various sliding portions decreases from coefficient of static friction (large) to coefficient of dynamic friction (small), and thus friction is reduced.

Furthermore, if, as is seen from FIG. 5A, a needle bearing 63 is operatively put in an annular clearance defined between drive cam 7 and a cylindrical inner wall of the circular opening of link arm 12, such friction can be effectively reduced. Furthermore, if the above-mentioned swing cams 9 and 9 are not of a sliding follower type as is shown in FIG. 2 but a roller follower type, such friction can be more effectively reduced. These friction reduction brings about an improved switching responsiveness for the operation angle of intake valves 4 and 4.

At the time when engine cranking just starts, a remarkable electric current flows, the battery voltage is greatly reduced. However, in the invention, switching of the operation angle of intake valves 4 and 4 is carried out at the time when a predetermined time (a) has passed from the starting (I) of engine cranking. Since the battery voltage returns to substantially normal level at the time (a), the switching of the operation angle of intake valves 4 and 4 is smoothly made.

Thereafter, control for fuel injection and ignition of air/fuel mixture is carried out while setting the fuel injection valve and ignition plug 05.

And at step S7, combustion of air/fuel mixture is effected starting a self-sustaining of the engine. Under this condition, the valve close timing (IVC) of intake valves 4 and 4 is kept advanced relative to the piston top dead center and thus the effective compression ratio is high. Thus, the engine starting under such cold engine condition is effectively and smoothly carried out.

In case of Reference example-1 indicated by a dot-dash line in the time chart of FIG. 11A, intake valves 4 and 4 are controlled to have a fixed maximum operation angle "D3". In this case, the engine vibration at the initial stage of engine cranking can be reduced. However, since the effective compression ratio is small, smoothed engine starting under a cold engine condition is not expected. Accordingly, as is seen from the time chart of FIG. 11B, the engine vibration at the time when the combustion of air/fuel mixture is effected is remarkably reduced.

In case of Reference example-3 indicated by a dot-dot-dash line in the time chart of FIG. 11A, reduction of the operation angle for intake valves 4 and 4 is carried out before starting the engine cranking. In this case, before the engine cranking, the friction of the sliding portions shows coefficient of static friction, and thus, the switching responsiveness for the operation angle of intake valves 4 and 4 is poor. Thus, in this case, it is inevitably necessary to use a big power type for electric motor 20, which brings about increase in electric power consumption of the battery.

Furthermore, in case of Reference example-2 in which the operation angle is set to "D2" just before engine cranking, undesired engine vibration takes place at the initial stage of the engine cranking, as has been mentioned hereinabove.

Referring back to the flowchart of FIG. 10, when at step S3 judgment is so made that the temperature of the engine is higher than the predetermined temperature "To", the operation flow goes to step S8 judging that the engine has been heated.

At step S8, engine cranking is started. Like the above-mentioned step S4, in this case, since the valve close timing "P3" (IVC) (see FIG. 7) of intake valves 4 and 4 is sufficiently retarded relative to the piston bottom dead center, undesired engine vibration at the initial stage of the engine cranking is suppressed or at least minimized at step S9.

Figure 12A:
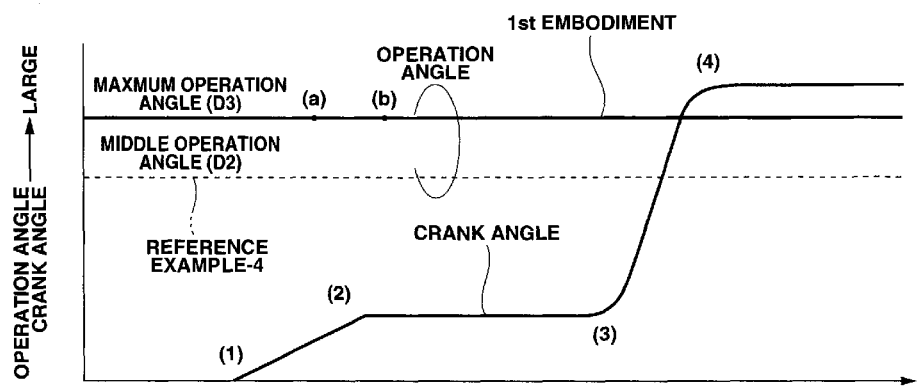
FIGS. 12A and 12B are time charts provided when a hot starting is carried out by the engine, FIG. 12A showing a relation between an operation angle of the intake valve controlled by the controller and an elapsed time, and FIG. 12B showing a relation between an engine vibration and an elapsed time.
Figure 12B:
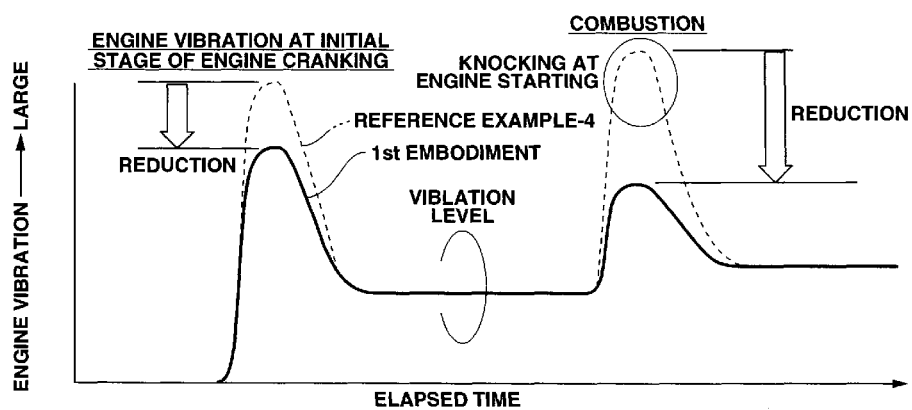

In FIGS. 12A and 12B, indicated by the broken line is a case of Reference example-4 in which intake valves 4 and 4 are is controlled to have a fixed operation angle "D2". In this case, the engine vibration at the initial stage of the engine cranking is increased. However, in the present invention, as is indicated by the solid line, such engine vibration is sufficiently reduced.

Referring back to the flowchart of FIG. 10, at step S10, the operation angle of intake valves 4 and 4 is controlled to keep the maximum value "D3" during the engine cranking.

At step S11, combustion of air/fuel mixture is effected starting a self-sustaining of the engine. Under this condition, the effective compression ratio is small, and thus, undesired engine knocking caused by a high temperature of the engine is suppressed or at least minimized.

In case of Reference example-4, when the engine temperature is high, the effective compression ratio is high. Thus, in case of Reference example-4, injection of fuel into the combustion chamber tends to induce abnormal early ignition of the fuel, which causes generation of undesired engine knocking. However, in the present invention, such engine knocking is suppressed or at least minimized.

If desired, at step S10, during the time from point (a) to point (b) in the time chart of FIG. 11A, the operation angle of intake valves 4 and 4 may change from the maximum value "D3" to a value larger than the value "D2". In this case, the effective compression ratio is slightly high. Accordingly, by using a known technique to reduce the knocking, the time needed for completing the engine starting can be shortened, which improves acceleration of a hybrid type motor vehicle at the starting.

Since, as is seen from FIG. 11A, the timing of occurrence of (b) is somewhat retarded as compared with the point (2) when a starter motor is accelerated, the electric current consumed by the starter motor is saved. Thus, changing the operation angle to angle "D2" is assuredly carried out.

Figure 13:
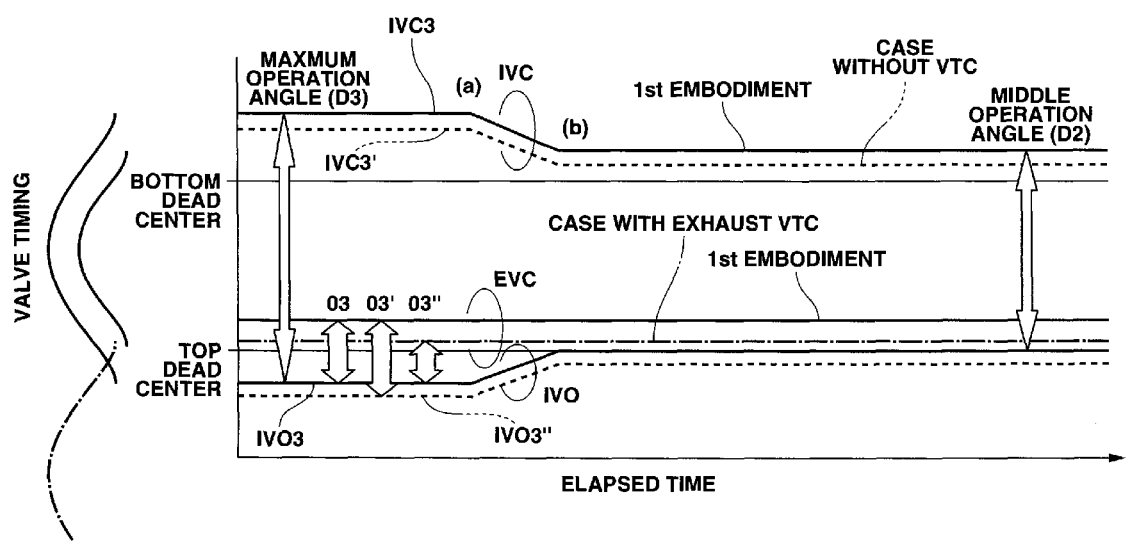
FIG. 13 is a time chart provided when a cold starting is carried out by the engine, showing a relation between a valve timing of the intake valve controlled by the intake VTC and an elapsed time.

FIG. 13 is a flowchart showing a valve timing of intake valves 4 and 4 at the time of cold engine starting. The valve open timing (IVO) and valve close timing (IVC) of intake valves 4 and 4 effected by the above-mentioned intake VTC2 are indicated by the solid lines in FIG. 13. It is to be noted that a time gap between IVO and IVC corresponds to the operation angle of the valves 4 and 4.

If the intake VTC2 is not used, the valve open and close timings of intake valves 4 and 4 are those indicated by the broken lines. That is, in this non-use case, the operation angle is advanced by a degree corresponding to a default retarded angle made by intake VTC2 (that is, IVC3->IVC3') and the valve close timing (IVC) of intake valves 4 and 4 is slightly advanced causing a slight increase in the engine vibration at the initial stage of the engine cranking, and the open timing (IVO) of intake valves 4 and 4 is also advanced (IVO3->IVO3') causing increase in the valve overlap between intake and exhaust valves (O3->O3') an thus causing increase in dispersion of the intake air amount. However, since intake VTC2 is not used, the control of the system is facilitated.

In the following, explanation will be directed to a case wherein an exhaust VTC as a valve timing varying mechanism is used for actuating exhaust valves 5 and 5. However, in the present invention, such exhaust VTC is not used, and thus, in the time chart of FIG. 13, the valve close timing (EVC) of exhaust valves is shown to have a fixed value as is indicated by the solid line in FIG. 13.

When, by using the exhaust VTC, the operation angle of exhaust valves 5 and 5 is set to a default position, that is, an advanced position to stably and mechanically hold the operation condition of exhaust valves 5 and 5 (see dot-dash-dash line), the valve close timing (EVC) of exhaust valves 5 and 5 is advanced. Under this condition, the valve overlap between intake and exhaust valves 4 and 5 is reduced (O3->O3") and thus dispersion of the intake air amount (or effective compression ratio) is suppressed or at least minimized.

If desired, the following modifications may be employed in the present invention.

The large operation angle default (viz., operation angle held just before engine cranking) of intake VEL1 is not necessarily set to the maximum value "D3". If desired, the default may be set to an angle slightly smaller than the maximum value "D3". In this case, if coil spring 31 (see FIG. 3) is set to produce a biasing force that is slightly lower than a counterforce of valves 4 and 4 at the time of the maximum operation angle, the mechanically stable default position (or angle) is slightly smaller than the maximum operation angle.

For keeping the operation angle of intake valves 4 and 4 just before the engine cranking, the following method can be also used in addition to the method of changing the biasing force of coil spring 31. That is, stopping the operation angle of intake valves 4 and 4 at the maximum operation angle is made before the engine stop by providing the drive mechanism with a one-way speed reduction device.

In case of a retarded default of intake VTC2, similar measures may be used. That is, if intake valves 4 and 4 can be held at the retarded side by lock pin or the like just before the engine cranking, coil springs 55 and 56 (see FIG. 8) are not always necessary.

In the following, a second embodiment of the present invention will be described with the aid of FIG. 14.

Figure 14:
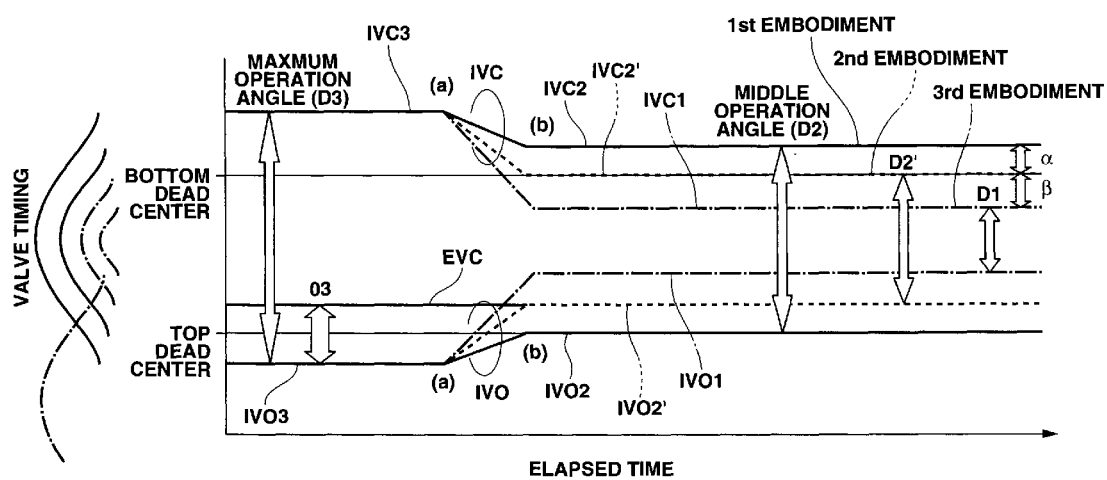
FIG. 14 is a time chart similar to that of FIG. 13, but showing, in addition to case of the first embodiment, cases of second and third embodiments of the invention.

FIG. 14 shows variations of the operation angle reduction control that are selectively used under engine cranking at the time of cold engine starting.

That is, as is indicated by broken line, the operation angle of intake valves 4 and 4 is set to a value "D2'" that is smaller than the operation angle "D2" in case of the above-mentioned first embodiment, so that the valve close timing (IVC) of intake valves 4 and 4 is set generally to the piston bottom dead center. With such setting, the effective compression ratio at the time of full combustion of air/fuel mixture becomes the maximum value.

In the following, a third embodiment of the present invention will be described with reference to FIG. 14.

As is indicated by a dot-dash line in FIG. 14, in the third embodiment, the operation angle of intake valves 4 and 4 is further reduced to the value "D1", so that the valve close timing (IVC) of the valves is controlled to a position (IVC1) prior to the piston bottom dead center.

As is seen from the time chart of FIG. 14, the time or angle "β" between the valve close timing (IVC) and the piston bottom dead center and the time or angle "α" between the piston bottom center and the valve close timing in case of the above-mentioned first embodiment are substantially the same. This means that the effective compression ratio is substantially the same in both embodiments (viz., third and first embodiments).

The third embodiment has further the following advantage.

That is, in the third embodiment, the operation angle "D" is smaller than the operation angle "D2" of the first embodiment and thus, the friction of the mutually contacting and sliding portions is very low as compared with the first embodiment. Thus, responsiveness of the piston upon combustion of the air/fuel mixture is much increased.

Furthermore, since, in the third embodiment, the valve open timing (IVO) of intake valves 4 and 4 is retarded relative to the piston top dead center, the following advantageous phenomena are inevitably produced which are that the open action of the valves 4 and 4 is effected after the negative pressure in the cylinder has sufficiently developed, the lift degree of the valves 4 and 4 is small because of reduction in the operation angle. Due to these advantageous phenomena, the speed of air led into the combustion chamber is increased and thus atomization of injected fuel is improved and sufficient turbulence effect of inlet air is achieved bringing about a satisfied or perfect combustion of the air/fuel mixture.

Figure 15:
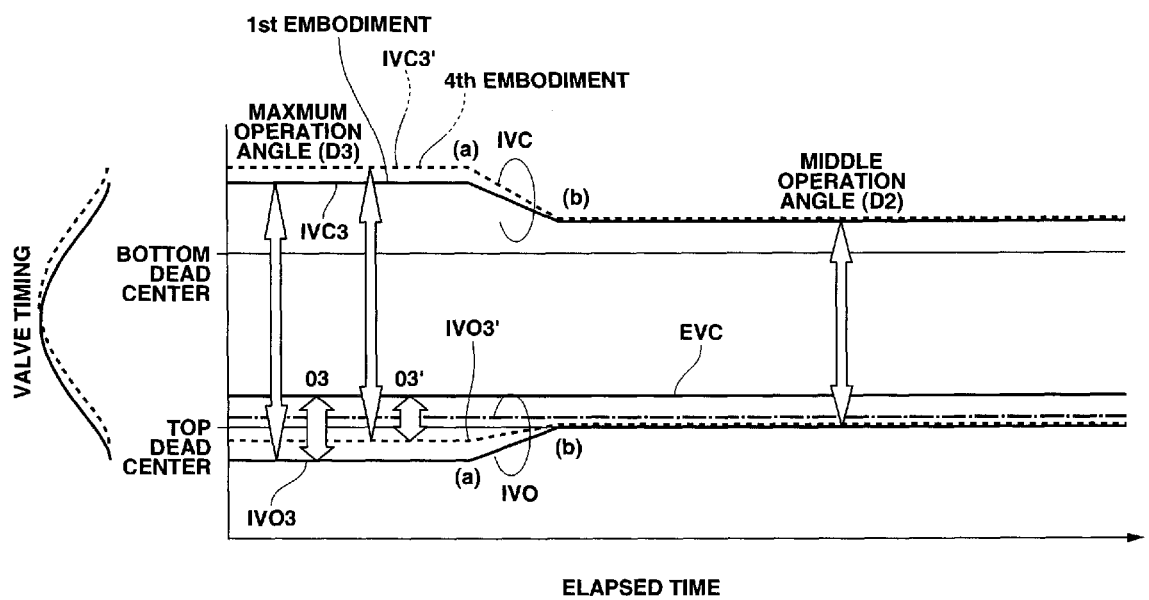
FIG. 15 is a time chart similar to that of FIG. 13, but showing, in addition to case of the first embodiment, a case of a fourth embodiment of the invention.

In the following, a fourth embodiment of the present invention will be described with reference to FIG. 15.

In this fourth embodiment, as the lift varying mechanism (viz., intake VEL), the mechanism described in Japanese Laid-open Patent Application (Tokkaihei) 11-264307 is used. That is, the variation of the valve closing timing (IVC) is larger than that of the valve open timing (IVO).

In the following, consideration will be directed to a case in which, like in the first embodiment, the operation angle of intake valves 4 and 4 is varied from the maximum value "D3" to the middle value "D2". First, consideration will be directed to an operation as to how the valve timing of the valves 4 and 4 is controlled before the engine cranking in a case wherein the valve open timing (IVO) and valve close timing (IVC), that are to be controlled during the engine cranking under the middle operation angle "D2", are set to the same timings as set in case of the first embodiment.

In the lift varying mechanism (intake VEL) 1 employed in the fourth embodiment, the valve close timing (IVC) of intake valves 4 and 4 has an increased variation and thus, the valve close timing under the operation angle "D3" is much retarded (IVC3->IVC3'). Thus, the valve close timing (IVC) of intake valves 4 and 4 at the initial stage of the engine cranking is much retarded, and thus, the undesired engine vibration at the initial stage of the engine cranking is much effectively reduced.

Furthermore, since the advance of the valve open timing (IVO) under the maximum operation angle "D3" is restrained (IVO3->IVO3'), the valve overlap between intake and exhaust valves 4 and 5 is reduced (O3->O3') and the fresh air intake manner becomes stable (more specifically, the amount of air backwardly led into the combustion chamber from the exhaust ports is reduced), stable combustion of the air/fuel mixture is achieved.

In the following, a fifth embodiment of the present invention will be described with reference to the flowchart of FIG. 16. In this fifth embodiment, control is operatively applied to a case wherein after the engine starting, the engine is subjected to a so-called high load engine knocking.

At step S12, due to work of the intake VEL 1 and intake VTC2, intake valves 4 and 4 are controlled in accordance with a control map.

At step S13, due to work of knocking sensor 62 (see FIG. 1) and controller 22, judgment is carried out as to whether engine knocking takes place or not. If it is judged that no knocking takes place, the operation flow goes to Return. However, if it is judged that knocking actually takes place, the operation flow goes to step S14.

At step S14, the operation angle for intake valves 4 and 4 is increased by a given degree by intake VEL 1. With this increase of the operation angle, the effective compression ratio is reduced and thus the inner pressure in the cylinder is reduced thereby suppressing generation of the undesired engine knocking.

Then, the operation flow goes to step S15. In this step, judgment is carried out as to whether engine knocking still takes place or not. If NO, the operation flow goes to Return. Under this condition, the knocking suppression control does not depend on the retardation of an ignition timing, deterioration in fuel consumption of the engine and excessive temperature increase of the exhaust gas (which deteriorates catalyst converter) are suppressed or at least minimized. Furthermore, as is shown in FIG. 2, due to provision of coil spring 31 by which the intake VEL1 is biased to cause intake valves 4 and 4 to take the maximum operation angle, the switching responsiveness to the larger side of operation angle is improved and thus suppression of the engine knocking is speedily carried out.

Figure 16:
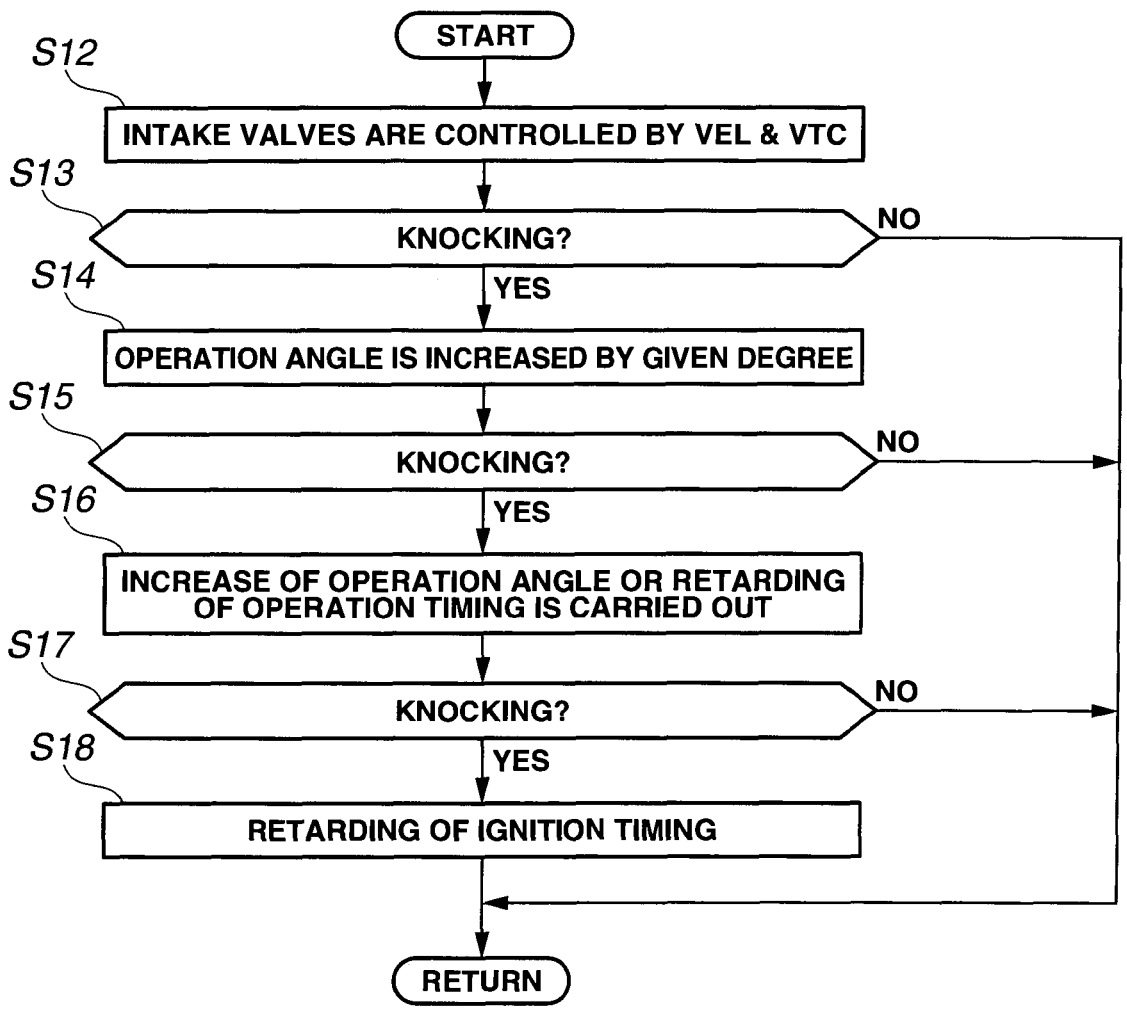
FIG. 16 is a flowchart showing programmed operation steps carried out by a controller employed in a fifth embodiment of the present invention.

While, if YES at step S15 of the flowchart of FIG. 16, that is, if it is judged that the engine knocking still takes place, the operation flow goes to step S16.

At step S16, either one of actions or both of the following actions are carried out. One action is to increase the operation angle of intake valves 4 and 4 by using the intake VEL1 and the other action is to retard the operation timing of the valves 4 and 4 by using the intake VTC2. With such actions, the effective compression ratio is much more reduced and thus undesired engine knocking is assuredly suppressed. Also in this case, since the knocking suppressing control does not depend on the retardation of the ignition timing, deterioration in fuel consumption of the engine and excessive temperature increase of the exhaust gas that deteriorates catalyst converter are suppressed. Then, the operation flow goes to step S17.

At step S17, judgment is carried out as to whether engine knocking still takes place or not. If NO, the operation flow goes to Return. While, if YES, that is, if it is judged that the engine knocking still takes place, the operation flow goes to step S18 judging that a trouble has occurred in the intake VEL1 or intake VTC2.

At step S18, retarding control for the ignition timing is carried out to prevent damage of the piston. That is, at step S18, a so-called failsafe operation is carried out.

Thus, in this case, due to the retarding control for the ignition timing, the above-mentioned fuel consumption reduction effect and exhaust temperature reducing effect are somewhat lowered. However, the failsafe operation is obtained.

In the above description, the control is directed to a high load engine knocking. However, if desired, such knocking suppressing control may be applied to the case shown in FIGS. 12A and 12B. That is, the operation angle of intake valves 4 and 4 is set to a value that is slightly smaller than the maximum value, and when, due to increased temperature of the engine, an engine knocking takes place at the initial stage of the engine starting (which may be caused by a pre-ignition), an interruption route (not shown) is practically used in the flowchart of FIG. 16 for retarding the valve close timing (IVC) of intake valves 4 and 4. With this, a so-called engine start knocking is suppressed or at least minimized.

In the present invention, the intake VEL as the operation angle varying mechanism is not limited to the above-mentioned type that varies the operation angle of the valves by rotating the control shaft 17. That is, if desired, the intake VEL may use a type disclosed in Japanese Laid-open Patent Application (Tokkai) 2008-2292 in which the variation of the operation angle is made by moving the control shaft axially.

In the foregoing description, the engine temperature is sensed by detecting the temperature of the engine cooling water. However, if desired, the engine temperature may be the temperature detected by a temperature sensor mounted to a cylinder block of the engine. Furthermore, if desired, such engine temperature may be estimated from a factor that has a closed relation with the engine temperature, for example, an engine torque produced at the same rotation speed.

The entire contents of Japanese Patent Application 2008-313810 filed Dec. 10, 2008 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A controller of a variable valve device for controlling a lift operation crank angle varying mechanism that varies an operation angle of an intake valve of an internal combustion engine, which is configured to:
   before starting the engine, set the lift operation crank angle varying mechanism to control the intake valve to have an operation angle as to retard a valve close timing of the intake valve relative to a piston bottom dead center;
   define a given period from an instruction time when an instruction signal is fed to the controller for starting the engine to a time when a combustion of air/fuel mixture is actually commenced in the engine; and
   when, in the given period, a temperature representing the temperature of the engine is lower than a predetermined temperature, reduce the operation angle of the intake valve to bring the valve close timing of the intake valve near to the piston bottom dead center.

2. A controller of a variable valve device as claimed in claim 1, in which the controller is further configured to, when in the given period the temperature representing the temperature of the engine is higher than the predetermined temperature, control the lift operation crank angle varying mechanism such that the intake valve has an operation angle as to retard the valve close timing of the intake valve relative to the piston bottom dead center.

3. A controller of a variable valve device as claimed in claim 2, in which the controller is further configured to control the operation angle of the intake valve so as to retard the valve close timing of the intake valve relative to the piston bottom dead center by keeping the operation angle having been set before the engine starting.

4. A controller of a variable valve device as claimed in claim 1, in which the lift operation crank angle varying mechanism is constructed such that at the time of varying the operation angle of the intake valve, a variation of the valve close timing of the intake valve is larger than that of the valve open timing of the intake valve.

5. A controller of a variable valve device as claimed in claim 1, in which the variable valve device is provided with a phase varying mechanism that varies an open/close phase of the intake valve, in which the phase varying mechanism is set to retard the valve open/close timing of the intake valve before the engine starting and in which the retarded valve open/close timing is kept in the given period.

6. A controller of a variable valve device as claimed in claim 5, in which the phase varying mechanism is set to keep the valve open/close timing of the intake valve to the most retarded position before the engine starting.

7. A controller of a variable valve device as claimed in claim 1, in which when the temperature representing the temperature of the engine is lower than the predetermined temperature, the operation angle of the intake valve is controlled to bring the valve close timing of the intake valve to the piston bottom dead center at the time when combustion of air/fuel mixture is satisfactorily carried out.

8. A controller of a variable valve device as claimed in claim 1, in which when the temperature representing the temperature of the engine is not higher than the predetermined temperature, the operation angle of the intake valve is controlled to make the valve close timing of the intake valve occur earlier than the piston reaches the bottom dead center.

9. A controller of a variable valve device as claimed in claim 1, in which when the temperature representing the temperature of the engine is lower than the predetermined temperature, the operation angle of the intake valve is controlled such that when a predetermined time passes from the instruction, the valve close timing of the intake valve is brought near to the piston bottom dead center.

10. A variable valve device of an internal combustion engine for controlling a lift operation crank angle varying mechanism that varies an operation angle of an intake valve of the engine, which is configured such that:
   before starting the engine, the lift operation crank angle varying mechanism is set to control the intake valve to have such an operation angle as to have an effective compression ratio smaller than the maximum effective compression ratio;
   means is provided to define a given condition in which under rotation of a crankshaft of the engine an ignition plug is energized; and
   when under the given condition the temperature representing the temperature of the engine is lower than a predetermined temperature, the lift operation crank angle varying mechanism is controlled to control the intake valve to have such an operation angle as to bring the valve close timing of the intake valve near to a timing when a maximum effective compression ratio is provided.

11. A variable valve device of an internal combustion engine as claimed in claim 10, in which when under the given condition of the engine the temperature representing the temperature of the engine exceeds the predetermined temperature, the lift operation crank angle varying mechanism is controlled to control the valve close timing of the intake valve to have an effective compression ratio that is smaller than the maximum effective compression ratio.

12. A variable valve device of an internal combustion engine as claimed in claim 10, in which when, before the engine starting or under the given condition of the engine, the temperature representing the temperature of the engine is higher than the predetermined temperature, the lift operation crank angle varying mechanism is controlled to control the operation angle of the intake valve to retard the valve close timing of the intake valve relative to the piston bottom dead center, and in which when, under the given condition of the engine, the temperature representing the temperature of the engine is lower than the predetermined temperature, the operation angle of the intake valve is controlled to bring the valve close timing of the intake valve near to the piston bottom dead center.

13. A variable valve device of an internal combustion engine as claimed in claim 12, in which when, under the given condition of the engine, the temperature representing the temperature of the engine is higher than the predeteiinined temperature, the operation angle of the intake valve that has been set before the engine starting is kept.

14. A variable valve device of an internal combustion engine as claimed in claim 13, in which the lift operation crank angle varying mechanism is constructed such that at the time of varying the operation angle of the intake valve, a variation of the valve close timing of the intake valve is larger than that of the valve open timing of the intake valve.

15. A variable valve device of an internal combustion engine as claimed in claim 13, in which the variable valve device is provided with a phase varying mechanism that varies an open/close phase of the intake valve, in which the phase varying mechanism is set to retard the valve open/close timing of the intake valve before the engine starting and in which the retarded valve open/close timing is kept in the given condition of the engine.

16. A variable valve device of an internal combustion engine as claimed in claim 13, in which when the temperature representing the temperature of the engine is lower than the predetermined temperature, the operation angle of the intake valve is controlled to bring the valve close timing of the intake valve to or near the piston bottom dead center at the time when combustion of air/fuel mixture is satisfactorily carried out.

17. A variable valve device of an internal combustion engine as claimed in claim 13, in which when the temperature representing the temperature of the engine is lower than the predetermined temperature, the operation angle of the intake valve is controlled to make the valve close timing of the intake valve occur earlier than the piston reaches the bottom dead center.

18. A variable valve device for varying a lift operation crank angle of an intake valve of an internal combustion engine, comprising:
   a lift operation crank angle varying mechanism that varies the operation angle of the intake valve thereby to control a valve close timing of the intake valve; and
   a control section that, when detecting a knocking of the engine, controls the lift operation crank angle varying mechanism to control the operation angle of the intake valve to retard the valve close timing of the intake valve relative to a piston bottom dead center,
   wherein the control section controls the lift operation crank angle varying mechanism such that a responsiveness of switching from an operation angle where the valve close timing of the intake valve matches with the piston bottom dead center to an operation angle where the valve close timing of the intake valve is retarded relative to the piston bottom dead center is higher than a responsiveness of switching from an operation angle where the valve close timing of the intake valve is retarded relative to the piston bottom dead center to an operation angle where the valve close timing of the intake valve approaches the piston bottom dead center.

19. A variable valve device as claimed in claim 18, in which the lift operation crank angle varying mechanism is provided with a biasing member for biasing the intake valve in a direction to retard the valve close timing relative to the piston bottom dead center.

* * * * *